(12) United States Patent
Sakata et al.

(10) Patent No.: US 8,421,782 B2
(45) Date of Patent: Apr. 16, 2013

(54) INFORMATION DISPLAYING APPARATUS AND INFORMATION DISPLAYING METHOD

(75) Inventors: Kotaro Sakata, Hyogo (JP); Shigenori Maeda, Kyoto (JP)

(73) Assignee: Panasonic Corporation, Osaka (JP)

( * ) Notice: Subject to any disclaimer, the term of this patent is extended or adjusted under 35 U.S.C. 154(b) by 277 days.

(21) Appl. No.: 12/867,811

(22) PCT Filed: Dec. 15, 2009

(86) PCT No.: PCT/JP2009/006884
§ 371 (c)(1),
(2), (4) Date: Aug. 16, 2010

(87) PCT Pub. No.: WO2010/070882
PCT Pub. Date: Jun. 24, 2010

(65) Prior Publication Data
US 2011/0050656 A1    Mar. 3, 2011

(30) Foreign Application Priority Data

Dec. 16, 2008    (JP) .................................. 2008-319228

(51) Int. Cl.
*H04N 7/13*    (2006.01)
*G06F 3/033*    (2006.01)

(52) U.S. Cl.
USPC ................ 345/204; 725/10; 725/12; 345/158

(58) Field of Classification Search .................... 345/204
See application file for complete search history.

(56) References Cited

U.S. PATENT DOCUMENTS

| | | |
|---|---|---|
| 5,731,805 A | 3/1998 | Tognazzini et al. |
| 5,943,049 A | 8/1999 | Matsubara et al. |

(Continued)

FOREIGN PATENT DOCUMENTS

| | | |
|---|---|---|
| JP | 10-13605 | 1/1998 |
| JP | 10-078845 | 3/1998 |

(Continued)

OTHER PUBLICATIONS

International Search Report issued Mar. 16, 2010 in International (PCT) Application No. PCT/JP2009/006884.

(Continued)

*Primary Examiner* — Kent Chang
*Assistant Examiner* — Ngan Pham Lu
(74) *Attorney, Agent, or Firm* — Wenderoth, Lind & Ponack, L.L.P.

(57) ABSTRACT

The present invention provides an information displaying apparatus which efficiently arouses an interest of the audience member to content to be displayed.
An information displaying apparatus (10) includes: a displaying unit (14) which displays first content on a display; an audience state detecting unit (11) which detects an audience state representing a physical state of an audience member positioned in front of the display; an interest degree estimating unit (12) which estimates an interest degree based on the audience state detected by the audience state detecting unit (11), the interest degree indicating a degree of interest of the audience member in the first content displayed on the display by the displaying unit (14); and a display control unit (13) which causes the displaying unit (14) to display second content with a clarity degree or an exposure degree of at least a part of the second content reduced below a predetermined clarity degree or a predetermined exposure degree when magnitude of a change rate of the interest degree estimated by the interest degree estimating unit (12) is smaller than a first threshold.

15 Claims, 21 Drawing Sheets

U.S. PATENT DOCUMENTS

| | | | |
|---|---|---|---|
| 6,535,132 B2 * | 3/2003 | Waters et al. | 340/573.1 |
| 6,675,075 B1 | 1/2004 | Engelsberg et al. | |
| 7,556,377 B2 * | 7/2009 | Beymer | 351/210 |
| 7,872,635 B2 * | 1/2011 | Mitchell | 345/158 |
| 2002/0013729 A1 | 1/2002 | Kida | |
| 2002/0022989 A1 | 2/2002 | Endo et al. | |
| 2002/0141614 A1 | 10/2002 | Lin | |
| 2003/0052911 A1 | 3/2003 | Cohen-solal | |
| 2005/0187437 A1 | 8/2005 | Matsugu et al. | |
| 2005/0259035 A1 | 11/2005 | Iwaki et al. | |
| 2006/0056509 A1 | 3/2006 | Suino et al. | |
| 2006/0271878 A1 | 11/2006 | Hashimoto | |
| 2007/0150916 A1 | 6/2007 | Begole et al. | |
| 2007/0271580 A1 | 11/2007 | Tischer et al. | |
| 2008/0147488 A1 * | 6/2008 | Tunick et al. | 705/10 |
| 2008/0238889 A1 | 10/2008 | Thorne | |
| 2009/0177528 A1 * | 7/2009 | Wu et al. | 705/10 |
| 2010/0107184 A1 * | 4/2010 | Shintani | 725/10 |

FOREIGN PATENT DOCUMENTS

| | | |
|---|---|---|
| JP | 10-187747 | 7/1998 |
| JP | 2783212 | 8/1998 |
| JP | 10-320093 | 12/1998 |
| JP | 2894307 | 5/1999 |
| JP | 11-276461 | 10/1999 |
| JP | 11-296542 | 10/1999 |
| JP | 2001-043384 | 2/2001 |
| JP | 2001-216527 | 8/2001 |
| JP | 2001-273064 | 10/2001 |
| JP | 2001-306941 | 11/2001 |
| JP | 2002-023685 | 1/2002 |
| JP | 2002-041537 | 2/2002 |
| JP | 2002-063264 | 2/2002 |
| JP | 2003-058086 | 2/2003 |
| JP | 2003-216635 | 7/2003 |
| JP | 2003-263145 | 9/2003 |
| JP | 2003-271283 | 9/2003 |
| JP | 2004-185139 | 7/2004 |
| JP | 2004-246709 | 9/2004 |
| JP | 2004-310554 | 11/2004 |
| JP | 2005-006897 | 1/2005 |
| JP | 2005-062748 | 3/2005 |
| JP | 2005-115476 | 4/2005 |
| JP | 2005-157134 | 6/2005 |
| JP | 3671258 | 7/2005 |
| JP | 2005-237561 | 9/2005 |
| JP | 2005-250322 | 9/2005 |
| JP | 3707361 | 10/2005 |
| JP | 2005-332309 | 12/2005 |
| JP | 3770374 | 4/2006 |
| JP | 2006-236013 | 9/2006 |
| JP | 2006-330912 | 12/2006 |
| JP | 2007-133304 | 5/2007 |
| JP | 2007-133305 | 5/2007 |
| JP | 2007-199035 | 8/2007 |
| JP | 3968778 | 8/2007 |
| JP | 2007-526501 | 9/2007 |
| JP | 2007-272369 | 10/2007 |
| JP | 2008-141484 | 6/2008 |
| JP | 2009-244553 | 10/2009 |
| JP | 2010-27043 | 2/2010 |
| WO | 01/29640 | 4/2001 |
| WO | 01/98971 | 12/2001 |
| WO | 2005/071656 | 8/2005 |

OTHER PUBLICATIONS

Masanori Miyahara et al., "Tagging Video Contents Based on Interest Estimation from Facial Expression", Information Processing Society of Japan Journal, vol. 49, No. 10, Oct. 2008, pp. 3694-3702.

Extended European Search Report issued Aug. 7, 2012 in corresponding European Patent Application No. 09833190.3.

* cited by examiner

FIG. 3
(a)
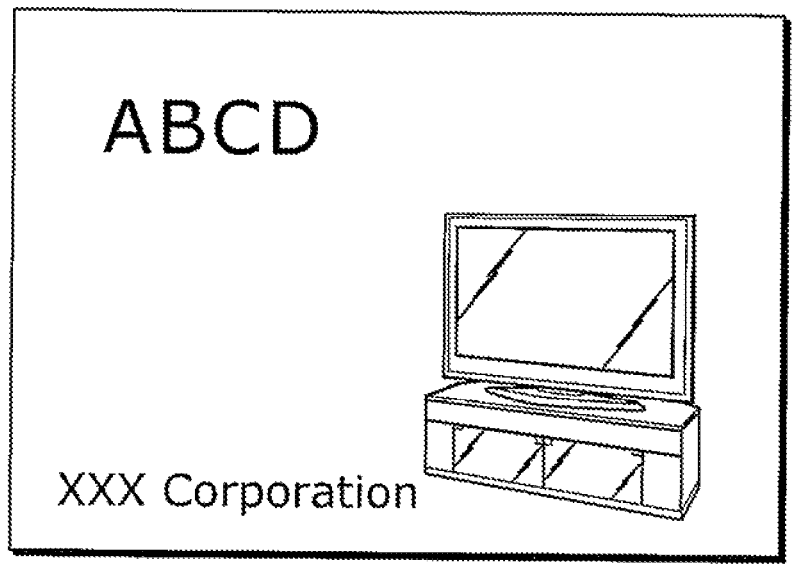
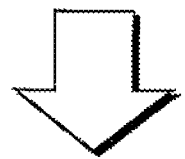
(b)
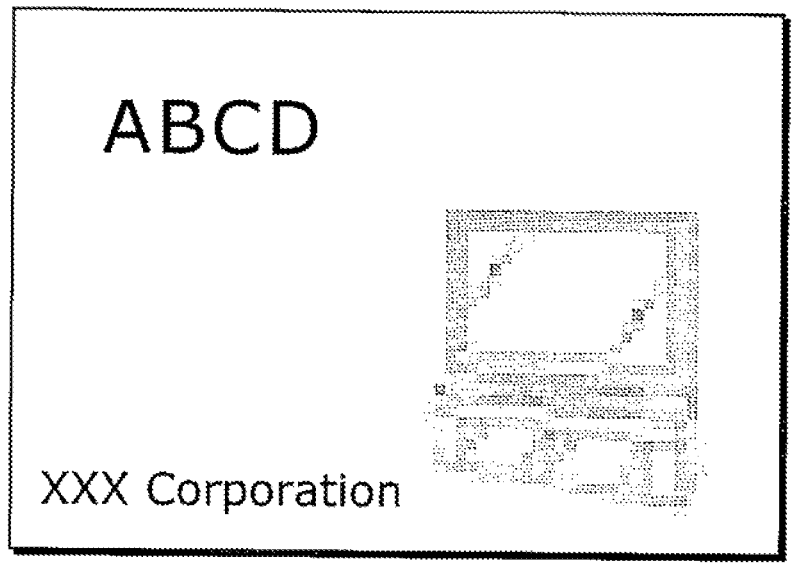

FIG. 4
(a)
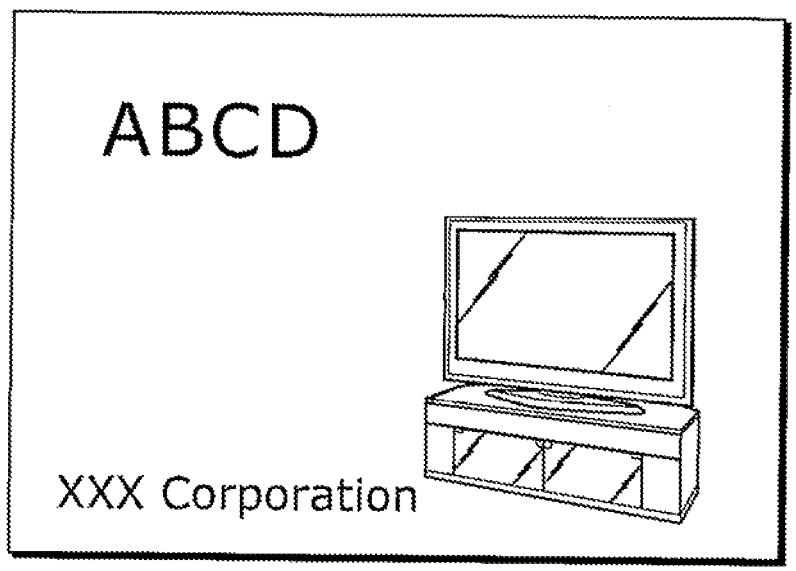
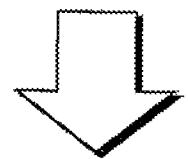
(b)
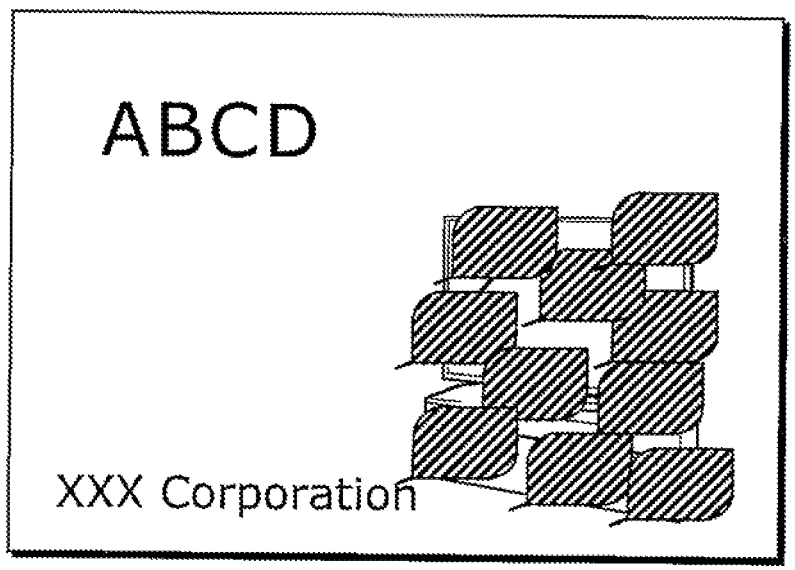

FIG. 10
| Interest degree level | Interest degree "k" | Content | Visual effect | Application area |
|---|---|---|---|---|
| 1 | 0~k1 | 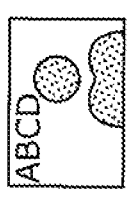 | | |
| 2 | k1~k2 | 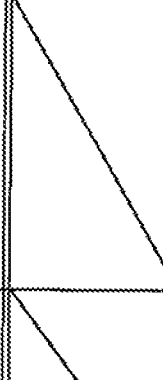 | hiding(20) | rectangle(20,50, 500,300) |
| 3 | k2~k3 | 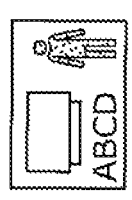 | blur(30) | all |
| ... | ... | ... | ... | ... |
| n | kn-1~kn | 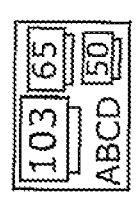 | blur(75) | random |

※ Values in parentheses indicate interest degrees of respective audience members

INFORMATION DISPLAYING APPARATUS AND INFORMATION DISPLAYING METHOD

TECHNICAL FIELD

The present invention relates to information displaying apparatuses which display content, and, in particular, to an information displaying apparatus which performs display control according to a state of an audience member.

BACKGROUND ART

Recent electronics advertisement systems have large-screen displays placed on the street to run advertisements on the displays. Installed in a downtown area, on a sidewall of a building nearby a station, and on a premise of a public transportation facility, those displays can provide information to a large indefinite number of people In a typical electronics advertisement system, however, an advertisement on a display merely receives a glance of the passers-by. Thus, the typical electronics advertisement system fails to make a strong impact on the audience members. In addition, since the conventional electronics advertisement system repeatedly runs the same image (advertisement), such a continuing image is boring to people watching the display and, for example, waiting for someone. Another electronics advertisement system is interactive, including a function used for searching for shopping information in order to awake people's curiosity. The system, unfortunately, is too troublesome for people walking on the street to utilize the search function. Even though awakening people's curiosity more than an ordinary billboard or a poster, the typical electronics advertisement systems described above still have room for further improvement in advertising effectiveness.

Concurrently, one of proposed information displaying apparatuses displays information in phases in response to a request which an audience member enters on an input unit (See Patent Literature 1, for example). Another proposed information displaying apparatus deletes information which is unrecognizable to the audience member depending on the distance between the audience member and the information displaying apparatus, and provides only recognizable information (See Patent Literature 2, for example).

Another proposed information displaying apparatus displays content information at appropriate timing according to a viewing state of an audience member while reproducing the content (See Patent Literature 3). The information displaying apparatus disclosed in Patent Literature 3 (i) determines an interest degree based on a time period in which the audience member is watching the content, and (ii) introduces to the audience member other content when the determined interest degree decreases.

The information displaying apparatuses disclosed in Patent Literatures 1 to 3 allow an audience member to efficiently obtain information.

CITATION LIST

Patent Literature

[PTL 1] Japanese Unexamined Patent Application Publication No. 11-296542
[PTL 2] Japanese Unexamined Patent Application Publication No. 2003-271283
[PTL 3] Japanese Unexamined Patent Application Publication No. 2005-250322

SUMMARY OF INVENTION

Technical Problem

The above typical information displaying apparatuses allow the audience member to efficiently obtain information; however, those apparatuses are unlikely to awake the audience member's curiosity in the displayed content. In other words, the conventional information displaying apparatuses fail to efficiently arouse an interest of the audience member.

The present invention is conceived in view of the above problems and has as an object to provide an information displaying apparatus which efficiently arouses an interest of the audience member to content to be displayed.

Solution to Problem

In order to achieve the above object, an information displaying apparatus according to an aspect of the present invention includes: a displaying unit which displays first content on a display; an audience state detecting unit which detects an audience state representing a physical state of an audience member positioned in front of the display; an interest degree estimating unit which estimates an interest degree based on the audience state detected by the audience state detecting unit, the interest degree indicating a degree of interest of the audience member in the first content displayed on the display by the displaying unit; and a display control unit which causes the displaying unit to display second content with a clarity degree or an exposure degree of at least a part of the second content reduced below a predetermined clarity degree or a predetermined exposure degree when magnitude of a change rate of the interest degree estimated by the interest degree estimating unit is smaller than a first threshold.

This structure allows the information displaying apparatus to display, based on the audience state, at least a part of content with the clarity degree or the exposure degree reduced below a predetermined clarity degree or a predetermined exposure degree. In other words, the information displaying apparatus develops the teasing effect to efficiently arouse an interest of the audience member.

Here, the teasing effect attracts the audience member's attention without revealing at least a part of information which content shows. Specifically, the teasing effect teases the audience member to increase the audience member's interest.

Preferably, the display control unit further raises the clarity degree or the exposure degree of the second content displayed on the display when the magnitude of the change rate of the interest degree estimated by the interest degree estimating unit exceeds a second threshold.

This structure allows the information displaying apparatus to dynamically raise a once-reduced clarity degree or a once-reduced exposure degree of the content based on the magnitude of the change rate of the interest degree of the audience member. Thus, the information displaying apparatus can disclose the information shown by the content when the audience member is getting interested in the content. As a result, the information displaying apparatus can arouse the interest of the audience member more efficiently, as well as significantly impress the audience member with information presented by the content.

Preferably, the display control unit raises the clarity degree or the exposure degree of the second content displayed on the display when the interest degree estimated by the interest degree estimating unit exceeds a third threshold.

This structure allows the information displaying apparatus to dynamically raise a once-reduced clarity degree or a once-reduced exposure degree of the content based on the magnitude of the interest degree of the audience member. Thus, the information displaying apparatus can disclose the information shown by the content when the audience member is interested in the content. As a result, the information displaying apparatus can arouse the interest of the audience member more efficiently, as well as significantly impress the audience member with information presented by the content.

Preferably, the display control unit further causes the displaying unit to display the second content when (i) the magnitude of the change rate of the interest degree estimated by the interest degree estimating unit is smaller than the first threshold, and (ii) a state in which the magnitude of the change rate of the interest degree estimated by the interest degree estimating unit is smaller than the first threshold lasts for a predetermined time period.

This structure allows the information displaying apparatus to reduce unnecessary changes of a clarity degree or an exposure degree of content caused by a temporary decrease in magnitude of the change rate of the interest degree in an audience member.

Preferably, the audience state detecting unit detects a traveling direction of the audience member as the audience state, and the interest degree estimating unit estimates that the interest is higher as the traveling direction of the audience member detected by the audience state detecting unit is more similar to a direction from the audience member to either (i) a position of the display or (ii) a position at which the first content is displayed.

This structure allows the information displaying apparatus to estimate an interest degree in high accuracy based on a traveling direction of the audience member.

Preferably, the audience state detecting unit detects a traveling speed of the audience member as the audience state, and the interest degree estimating unit estimates that the interest degree is higher as the traveling speed of the audience member detected by the audience state detecting unit is lower.

This structure allows the information displaying apparatus to estimate an interest degree in high accuracy based on a traveling speed of the audience member.

Preferably, the audience state detecting unit detects a position of the audience member as the audience state, and the interest degree estimating unit estimates that the interest degree is higher as distance is shorter between a position at which the first content is displayed and the position of the audience member detected by the audience state detecting unit.

This structure allows the information displaying apparatus to estimate an interest degree in high accuracy based on a position of the audience member.

Preferably, the audience state detecting unit detects an eye-gaze direction of the audience member as the audience state, and the interest degree estimating unit estimates that the interest degree is higher as the eye-gaze direction of the audience member detected by the audience state detecting unit is more similar to a direction from the audience member to either (i) a position of the display or (ii) a position at which the first content is displayed.

This structure allows the information displaying apparatus to estimate an interest degree in high accuracy based on a traveling direction of the audience member.

Preferably, the information displaying apparatus according to an aspect of the present invention further includes a targeted audience member selecting unit which selects a targeted audience member from among audience members positioned in front of the display, wherein, when magnitude of a change rate of an interest degree of the targeted audience member selected by the targeted audience member selecting unit is smaller than the first threshold, the display control unit preferably causes the displaying unit to display the second content.

This structure allows the information displaying apparatus to change a clarity degree or an exposure degree of content based on an audience state of a targeted audience member selected from among audience members found in front of the display. Thus, the information displaying apparatus can efficiently arouse an interest of an audience member selected as the targeted audience member.

Preferably, when the interest degree estimated by the interest degree estimating unit is equal to a fourth threshold or above, the targeted audience member selecting unit selects an audience member suitable for the interest degree as the targeted audience member.

This structure allows the information displaying apparatus to select, as the targeted audience member, an audience member whom the teasing effect can highly possibly interest. Thus, the information displaying apparatus can more efficiently arouse an interest of an audience member selected as the targeted audience member Preferably, when distance between a position at which the first content is displayed and a position of an audience member is smaller than a fifth threshold, the targeted audience member selecting unit selects the audience member as the targeted audience member.

This structure allows the information displaying apparatus to select, as the targeted audience member, an audience member whom the teasing effect can highly possibly interest. Thus, the information displaying apparatus can more efficiently arouse an interest of an audience member selected as the targeted audience member.

Preferably, the information displaying apparatus according to an aspect of the present invention further includes a content database which stores at least an application area indicating a position of a part showing essential information which is a part of the second content and is intended to be directed to an audience member, wherein the display control unit preferably causes the displaying unit to display the second content with a clarity degree or an exposure degree of the application area of the second content reduced below the predetermined clarity degree or the predetermined exposure degree, the second content being stored in the content database.

This structure allows the information displaying apparatus to reduce the clarity degree or the exposure degree of an area on which the essential information is displayed. Thus, the information displaying apparatus can further develop an attention of the audience member. As a result, the information displaying apparatus can efficiently arouse an interest of the audience member, as well as significantly impress the audience member with information directed to them.

Preferably, the predetermined clarity degree or the predetermined exposure degree is the clarity degree or the exposure degree of the first content, and the display control unit to causes the displaying unit to display the first content as the second content.

This structure allows the information displaying apparatus to reduce a clarity degree or an exposure degree of content which has already been displayed based on an audience state.

A method of displaying information according to another aspect of the present invention includes: displaying first content on a display; detecting an audience state representing a physical state of an audience member positioned in front of the display; estimating an interest degree based on the audience state detected in the detecting, the interest degree indicating a degree of interest of the audience member in the first content displayed on the display in the displaying the first content; and displaying second content with an area of a clarity degree or an area of an exposure degree of at least a part of the second content reduced below a predetermined clarity degree or a predetermined exposure degree when magnitude of a change rate of the interest degree estimated in the estimating is smaller than a first threshold.

This allows the method to achieve an effect similar to that of the above information displaying apparatus.

It is noted that the present invention can be achieved as a program to cause a computer to execute such a method of displaying information. As a matter of course, such a program can be distributed via a computer-readable storage medium including a Compact Disc Read Only Memory (CD-ROM), and a transmission medium including the Internet.

Advantageous Effects of Invention

As a result, the information displaying apparatus employs a teasing effect to attract the audience member's attention, and efficiently increases an interest of the audience member to the content.

BRIEF DESCRIPTION OF DRAWINGS

FIG. 3 shows a clarity degree.

FIG. 4 shows an exposure degree.

FIG. 10 exemplifies a content database according to Embodiment 2 of the present invention.

DESCRIPTION OF EMBODIMENTS

Described hereinafter are Embodiments of the present invention, with reference to the drawings.

[Embodiment 1]

An information displaying apparatus 10 according to Embodiment 1 of the present invention displays content on a display. The information displaying apparatus 10 has a feature of changing a clarity degree or an exposure degree of content displayed on a display (hereinafter referred to as "displayed content") depending on an interest degree of an audience member in displayed content.

Figure 1:
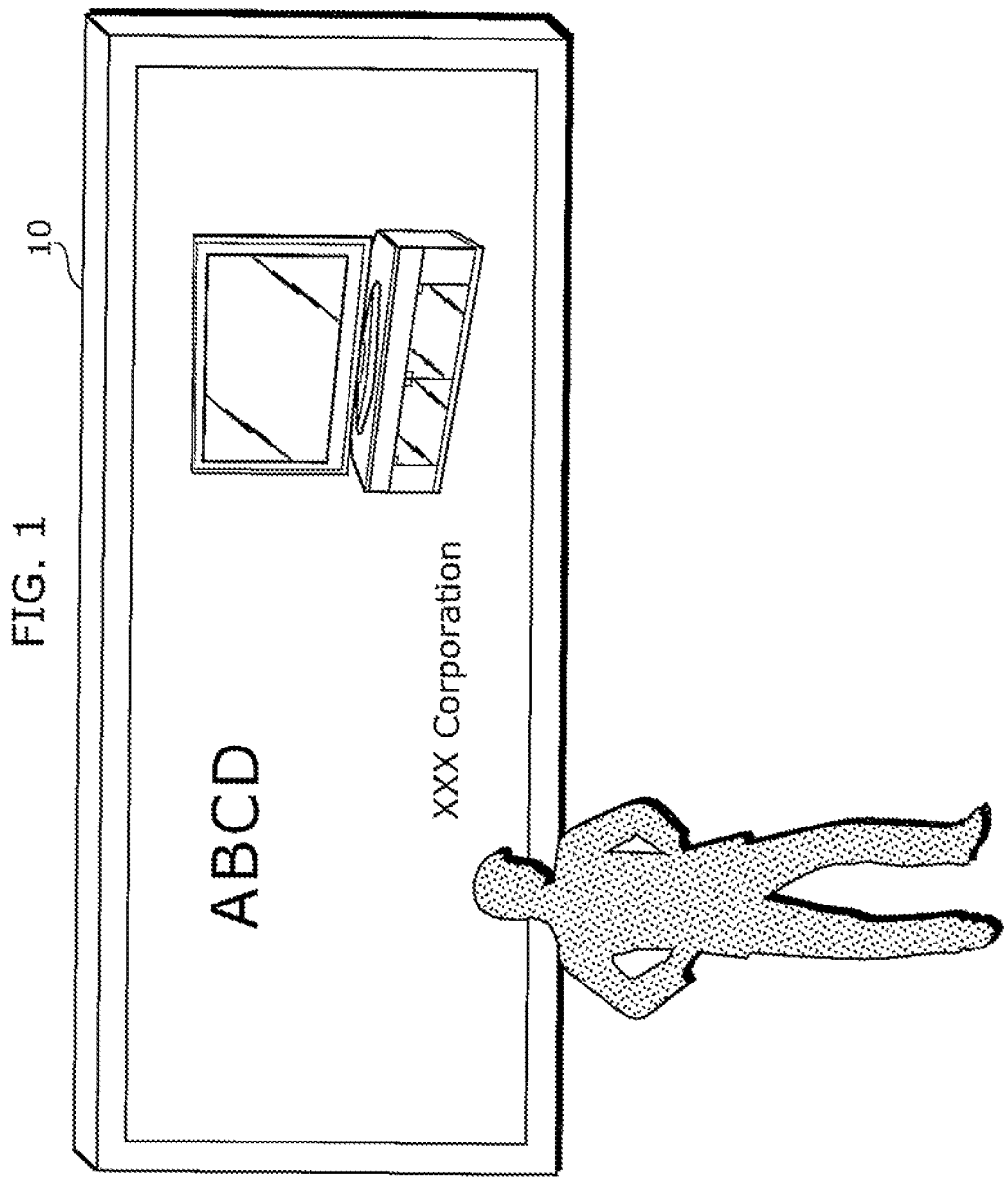
FIG. 1 shows an appearance of an information displaying apparatus according to Embodiment 1 of the present invention.
Figure 2:
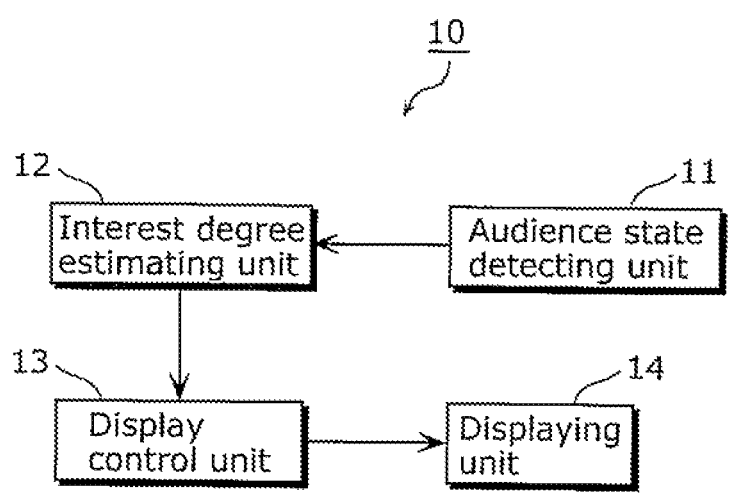
FIG. 2 is a block diagram showing a functional structure of the information displaying apparatus according to Embodiment 1 of the present invention.

FIG. 1 shows an appearance of an information displaying apparatus according to Embodiment 1 of the present invention. FIG. 2 is a block diagram showing a functional structure of the information displaying apparatus according to Embodiment 1 of the present invention.

The information displaying apparatus 10 includes an audience state detecting unit 11, an interest degree estimating unit 12, a display control unit 13, and a displaying unit 14.

The audience state detecting unit 11 detects an audience is state representing a physical state of an audience member positioned in front of the display. Specifically, the audience state detecting unit 11 detects the following as physical states of the audience member: a biosignal, such as a brain wave; a position, a speed, and orientations of the face and the body; an eye-gaze direction; a facial expression; content of an utterance; an amount of an utterance; and voice volume.

Based on the audience state detected by the audience state detecting unit 11, the interest degree estimating unit 12 estimates an interest degree indicating a degree of the audience member's interest in the content displayed on the display by the displaying unit 14.

Specifically, for example, the interest degree estimating unit 12 estimates that the interest degree of the audience member is higher as the traveling direction of the detected audience member is more similar to a direction from the audience member to either (i) a position of the display or (ii) a position at which the content is displayed. In other words, the interest degree estimating unit 12 estimates the interest degree to be higher as the audience member travels toward the display or the displayed content.

Here, the position of the display is a position observed on the display, such as a central position of the display (hereinafter referred to as "the center of the display") or the centroidal position of the display. The position at which the content is displayed is a position observed on the display displaying the content: that is, a position of the content. Specifically, the position at which the content is displayed is the central position of an area in which the content is displayed (hereinafter referred to as "the center of the content") or the centroidal position of the area. Furthermore, the position at which the content is displayed may be the central position or the centroidal position of an area in which an image is displayed to show a part of the content (an image showing an advertised product).

Moreover, for example, the interest degree estimating unit 12 estimates that the interest degree of the detected audience member is higher as the traveling speed of the detected audience member is lower. In other words, the interest degree estimating unit 12 estimates the interest degree to be higher as the audience member travels more slowly in front of the display.

Furthermore, for example, the interest degree estimating unit 12 estimates the interest degree to be higher as the distance is shorter between a position of the detected audience member and a position at which the content is displayed.

The interest degree estimating unit 12, for example, estimates the interest degree to be higher as the eye-gaze direction of the detected audience member is more similar to a direction from the audience member to either (I) a position of the display or (ii) a position at which the content is displayed. In other words, the interest degree estimating unit 12 estimates the interest degree to be higher as the audience member is looking at the display or toward the displayed content.

The interest degree estimating unit 12 may also estimate the interest degree based on the following detected audience states of the audience member: the biosignal; the facial expression, the content of an utterance; the amount of an utterance; and the information on the voice volume.

When the magnitude of the change rate of the interest degree estimated by the interest degree estimating unit 12 is smaller than a first threshold, the display control unit 13 causes the displaying unit 14 to display the content with the clarity degree or the exposure degree of at least a part of the content reduced below a predetermined clarity degree or a predetermined exposure degree.

Specifically, the display control unit 13 employs Expression (1) to calculate magnitude "a(t)" of the change rate indicating the degree of a temporal change of the interest degree. "K(t)" is an interest degree at time "t". Furthermore, the display control unit 13 determines whether or not the magnitude "a(t)" of the change rate calculated with Expression (1) is smaller than the first threshold.

Here, in the case where the magnitude "a(t)" of the change rate is smaller than the first threshold, the display control unit 13 causes the displaying unit 14 to display the content with either (i) a part or the whole clarity degree or (ii) a part or the whole exposure degree reduced below a clarity degree or an exposure degree of the content displayed on the display. In other word, the display control unit 13 reduces the clarity degree or the exposure degree of at least a part of the content displayed on the display during, for example, a predetermined time period.

$$a(t) = \left| \frac{k(t) - k(t - \Delta t)}{\Delta t} \right| \quad \text{Expression 1}$$

Here, the clarity degree represents a degree of content clarity; that is, a clarity degree of information shown in content. The clarity degree of content decreases when visual effects, such as blurring and pixelization, are applied to the content.

The exposure degree represents a degree of content exposure; that is, an exposure degree of information shown in content. The exposure degree of content decreases when an image, which is not included in the content, either overlaps with a part of an image included in the content or covers the entire image included in the content.

The first threshold indicates the fact that a variation in the interest degree of the audience member in content is decreasing due to a lowering interest of the audience member in the displayed content.

The displaying unit 14 is equipped with a display, such as a plasma display Panel (PDP) or a liquid crystal panel (LCD), to display content on the display.

FIG. 3 shows a clarity degree, and FIG. 4 shows an exposure degree. FIGS. 3 and 4 exemplify as content displayed on the display an image advertising a product, which is a TV, named "ABCD" and sold by "XXX Corporation".

FIG. 3(*a*) shows content before the clarity degree thereof is decreased. FIG. 3(*b*) shows content having a pixelized area is showing an appearance of a product. Here, the pixelized area is a part of the content.

As described above, the display control unit 13 reduces a clarity degree of a part of the content by (i) having the content with a part thereof processed using a visual effect, such as blurring and pixelization, (ii) and showing the processed content.

FIG. 4(*a*) shows content before the exposure degree thereof is decreased. FIG. 4(*b*) shows content with images overlapping with an area, which displays a part of the content, showing an appearance of a product. Here, the overlapping images are different from that of the product. The content in FIG. 4(*b*) is lower than that in FIG. 4(*a*) in content exposure degree.

As described above, the display control unit 13 reduces the exposure degree of a part of the content by (i) having images overlap with an area of a part of the content, and (ii) showing the content overlapped with the images. Here, the images are different from the original image of the content.

It is noted that the display control unit 13 may reduce the exposure degree of a part of the content by morphing an original image into an image other than the original image.

FIGS. 3 and 4 show how to reduce the clarity degree or the exposure degree of a part of the content. The display control unit 13 may reduce the clarity degree or the exposure degree of the entire content.

Preferably, the display control unit 13 reduces the clarity degree and the exposure degree of a part showing essential information; that is, information which is intended to be directed to an audience member. The above structure allows the information displaying apparatus 10 to (i) reduce the clarity degree or the exposure degree of an area displaying the essential information in order to develop the teasing effect, and (ii) attract the audience member's attention. Hence, the information displaying apparatus 10 can efficiently arouse an interest of the audience member, as well as significantly impress the audience member with information directed to them.

Described next are operations on the information displaying apparatus 10 structured above.

Figure 5:
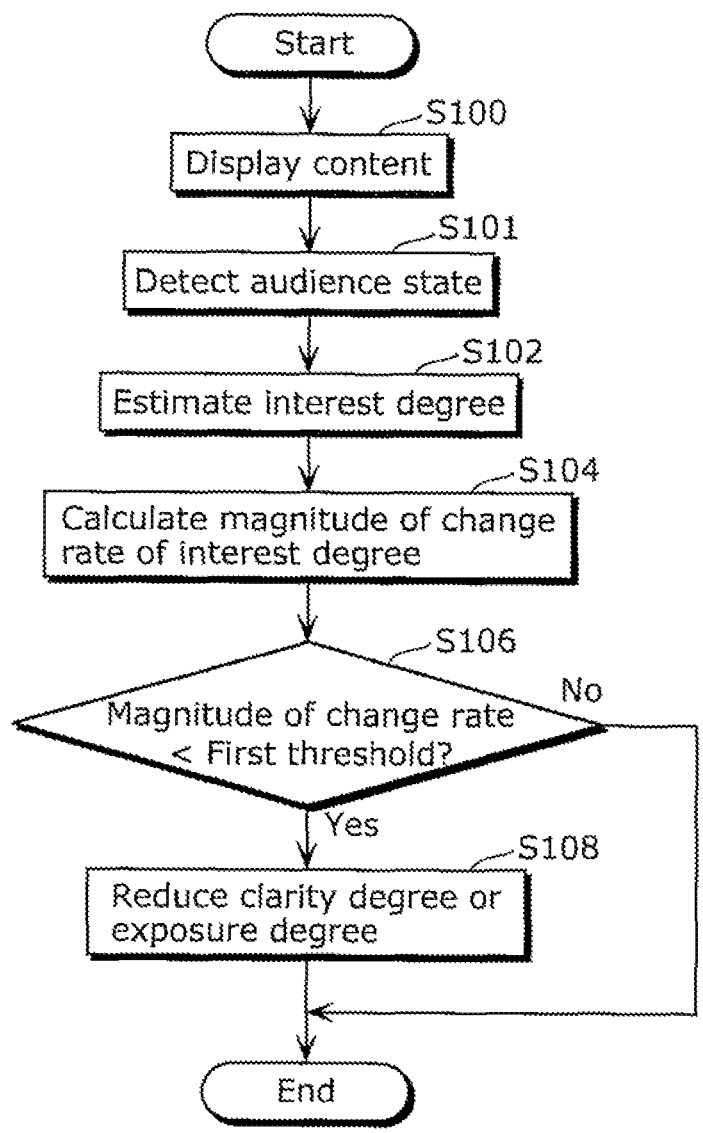
FIG. 5 is a flow chart showing a flow of a process executed on the information displaying apparatus according to Embodiment 1 of the present invention.

FIG. 5 is a flow chart showing a flow of a process executed on the information displaying apparatus according to Embodiment 1 of the present invention.

First, the displaying unit 14 displays content on the display (S100). Next, the audience state detecting unit 11 detects an audience state (S101). Based on the detected audience state, the interest degree estimating unit 12 estimates an interest degree (S102). Next, the display control unit 13 calculates magnitude of a change rate of the interest degree (S104). Then, the display control unit 13 determines whether or not the magnitude of the change rate of the interest degree is smaller than the first threshold (S106).

When the magnitude of the change rate of the interest degree is smaller than the first threshold (S106: Yes), the display control unit 13 reduces the clarity degree or the exposure degree of at least a part of the content displayed on the display (S108), and the process ends. Depending on the interest degree of the audience member, the display control unit 13 causes the displaying unit 14 to display the content with the clarity degree or the exposure degree of at least a part of the content reduced below a predetermined clarity degree or a predetermined exposure degree. On the other hand, when the magnitude of the change rate of the interest degree is equal to the first threshold or greater (S106: No), the information displaying apparatus 10 ends the process.

Executing the process including Steps S100 through S108, the information displaying apparatus 10 can display content on the display, with the clarity degree of at least a part of the content or the exposure degree of a part of the content reduced below a predetermined clarity degree or a predetermined exposure degree depending on the interest degree of the audience member. It is noted that the information displaying apparatus 10 may repeatedly execute the process including Steps S101 through S108.

As described above, the information displaying apparatus 10 according to Embodiment 1 can display content on the display, with the clarity degree or the exposure degree of at least a part of the content reduced below a predetermined clarity degree or a predetermined exposure degree depending on magnitude of a change rate of an interest degree of the audience member in the displayed content. As a result, the information displaying apparatus 10 can develop a teasing effect to attract the audience member's attention, and efficiently increase an interest of the audience member in the content.

It is noted in Embodiment 1 that the display control unit 13 causes the displaying unit 14 to display the content with the clarity degree or the exposure degree of the content reduced when the magnitude of the change rate of the interest degree is simply than the first threshold; concurrently, the content may be displayed in another case. For example, the display control unit 13 may cause the displaying unit 14 to display the content with the clarity degree or the exposure degree of at least a part of the content reduced below a predetermined clarity degree or a predetermined exposure degree when a state in which the magnitude of the change rate of the interest degree is smaller than the first threshold lasts for a predetermined time period. This structure allows the information displaying apparatus 10 to reduce unnecessary changes of a clarity degree or a exposure degree of content caused by a temporary decrease in magnitude of the change rate of the interest degree in an audience member.

[Modification 1 of Embodiment 1]

The information displaying apparatus 10 in Modification 1 according to Embodiment 1 differs from the information displaying apparatus 10 according to Embodiment 1 in that the information displaying apparatus 10 in Modification 1 displays content which differs from content currently displayed on the display when magnitude of a change rate of an interest degree of an audience member is small. Mainly focusing on the points different from Embodiment 1, described hereinafter is Modification 1 with reference to the drawings.

Similar to the information displaying apparatus 10 according to Embodiment 1 shown in FIG. 2, the information displaying apparatus 10 in Modification 1 includes the followings: the audience state detecting unit 11; the interest degree estimating unit 12; the display control unit 13; and the displaying unit 14. It is noted that the constituent elements in Modification 1; namely the audience state detecting unit 11, the interest degree estimating unit 12, and the displaying unit 14, are the same as those in Embodiment 1, and thus the details thereof shall be omitted.

The display control unit 13 according to Modification 1 causes the displaying unit 14 to display content which differs from content currently displayed on the display in the case where the magnitude of the change rate of the interest degree estimated by the interest degree estimating unit 12 is smaller than the first threshold. Here, a clarity degree or an exposure degree of at least a part of different content is reduced below a predetermined clarity degree or a predetermined exposure degree.

The predetermined clarity degree and the predetermined exposure degree respectively represent, for example, an original clarity degree and an original exposure degree of the content. In other words, a typical predetermined clarity degree or a typical predetermined exposure degree has either (i) no applied image effects employed for reducing a clarity degree or an exposure degree, or (ii) no executed image process employed for reducing a clarity degree or an exposure degree.

Described next are operations on the information displaying apparatus 10 according to Modification 1 structured above.

Figure 6:
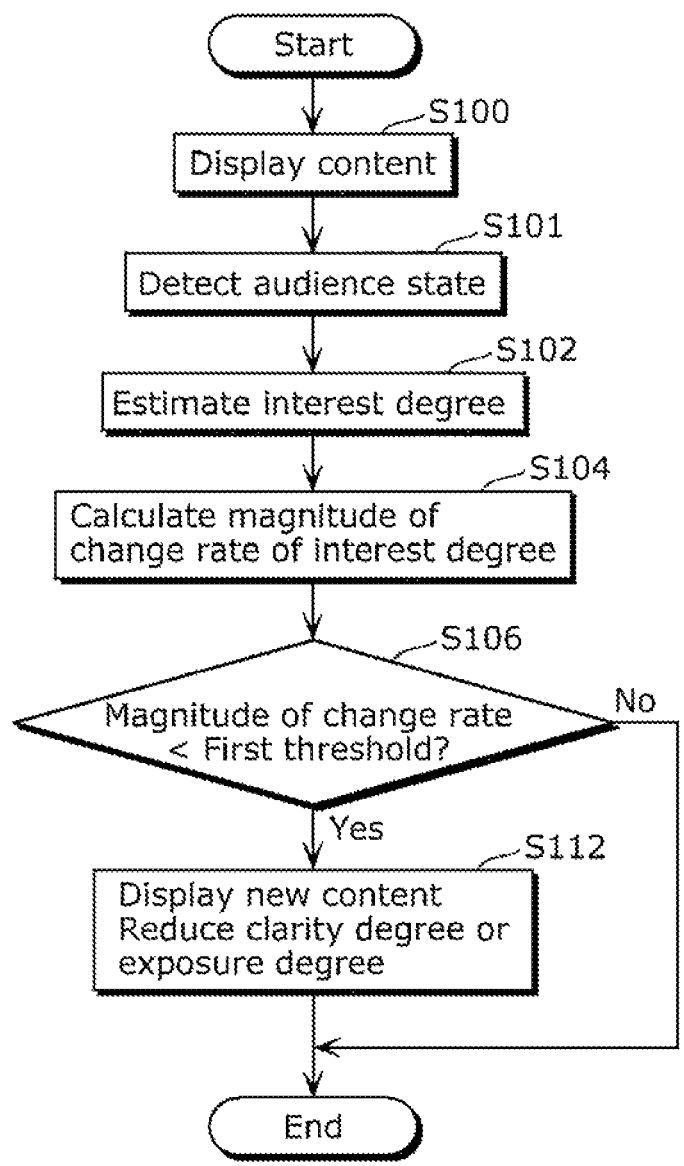
FIG. 6 is a flow chart showing a flow of a process executed on the information displaying apparatus in Modification 1 according to Embodiment 1 of the present invention.

FIG. 6 is a flow chart showing a flow of a process executed on the information displaying apparatus 10 in Modification 1 according to Embodiment 1 of the present invention. It is noted in FIG. 6 that the same processing steps as those in FIG. 5 share identical numerical references, and thus detailed descriptions shall be omitted.

When magnitude of a change rate of an interest degree is smaller than the first threshold (S106:Yes), the display control unit 13 causes the displaying unit 14 to display content which differs from content currently displayed on the display (S112), and ends the process. Here, a clarity degree or an exposure degree of at least a part of the different content is reduced below a predetermined clarity degree or a predetermined exposure degree. In other words, the display control unit 13 causes the displaying unit 14 to display content (i) with the clarity degree or the exposure degree of at least a part of the content previously reduced, and (ii) which differs from the content currently displayed on the display.

As described above, the information displaying apparatus 10 in Modification 1 can (i) display new content with a clarity degree or an exposure degree reduced in order to develop the teasing effect, and (ii) efficiently increase an interest of the audience member.

[Modification 2 of Embodiment 1]

A uniform reduction in clarity degree or exposure degree only during a predetermined period causes an excessive teasing period, which results in a decrease in interest of an audience member. The information displaying apparatus 10 in Modification 2 according to Embodiment 1 is featured to dynamically determine timing to raise a clarity degree or an exposure degree of content depending on an interest degree of the audience member. Mainly focusing on the points different from Embodiment 1, described hereinafter is Modification 2 with reference to the drawings.

Similar to the information displaying apparatus 10 according to Embodiment 1 shown in FIG. 2, the information displaying apparatus 10 in Modification 2 includes the followings: the audience state detecting unit 11; the interest degree estimating unit 12; the display control unit 13; and the displaying unit 14. It is noted that the audience state detecting unit 11, the interest degree estimating unit 12, and the displaying unit 14 in Modification 2 are the same as those in Embodiment 1, and thus the details thereof shall be omitted.

The display control unit 13 according to Modification 2 raises the clarity degree or the exposure degree of the content displayed on the display depending on the interest degree of the audience member.

Specifically, the display control unit 13 for example raises the clarity degree or the exposure degree of the content displayed on the display when magnitude of a change rate of an interest degree estimated by the interest degree estimating unit 12 exceeds a second threshold. The second threshold represents a value indicating the fact that the reducing clarity degree or the reducing exposure degree of the content raises the change rate of the interest degree of the audience member. Here, the second threshold is preferably greater than the first threshold.

The display control unit 13 for example may raise the clarity degree or the exposure degree of the content displayed on the display when the interest degree estimated by the interest degree estimating unit 12 exceeds a third threshold. The third threshold represents a value indicating the fact that the reducing clarity degree or the reducing exposure degree of the content raises the interest degree of the audience member.

Described next are operations on the information displaying apparatus 10 according to Modification 2 structured above.

Figure 7:
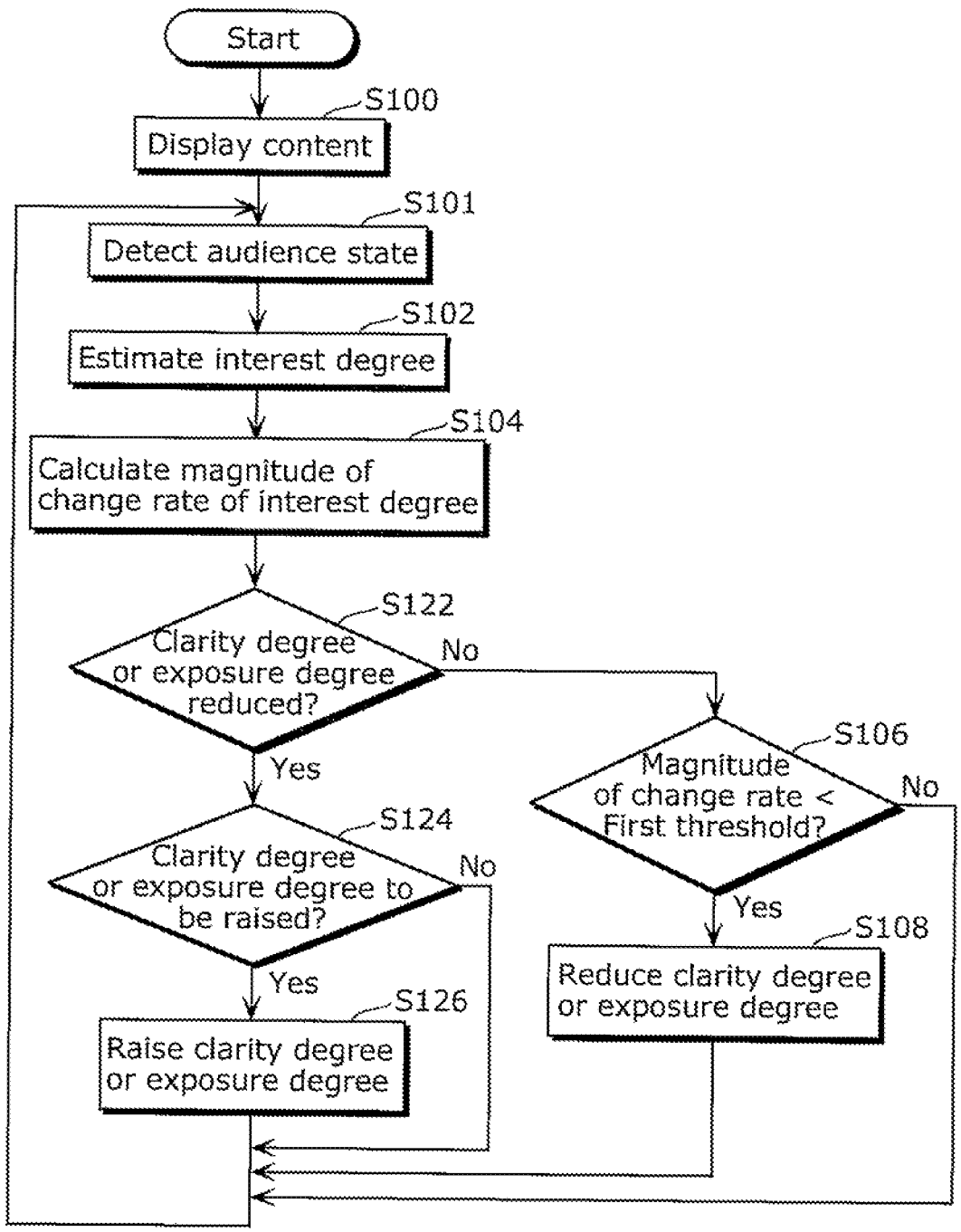
FIG. 7 is a flow chart showing a flow of a process executed on the information displaying apparatus in Modification 2 according to Embodiment 1 of the present invention.

FIG. 7 is a flow chart showing a flow of a process executed on the information displaying apparatus 10 in Modification 2 according to Embodiment 1 of the present invention. It is noted in FIG. 7 that the same processing steps as those in FIG. 5 share identical numerical references, and thus detailed descriptions shall be omitted.

Upon calculating magnitude of a change rate of an interest degree, the display control unit 13 determines whether or not a clarity degree or an exposure degree of content displayed on the display has already been reduced (S122). In other words, the display control unit 13 determines whether or not the clarity degree or the exposure degree of the content displayed on the display is below a predetermined clarity degree or a predetermined exposure degree.

When the clarity degree or the exposure degree has not reduced yet (S122: No), the information displaying apparatus 10 executes the process including Steps S106 through S109. Then, the process returns to Step S101.

When the clarity degree or the exposure degree has already reduced (S122: Yes), the display control unit 13 determines whether or not the clarity degree or the exposure degree of the content should be raised depending on the interest degree of the audience member (S124).

When determining that the clarity degree or the exposure degree of the content should be raised (S124: Yes), the display control unit 13 raises the clarity degree or the exposure degree of the content displayed on the display (S126). Then, the process returns to Step S101. Concurrently, when the display control unit 13 determines not to raise the clarity degree or the exposure degree, the process returns to Step S101.

As described above, the information displaying apparatus 10 according to Modification 2 can dynamically raise a clarity degree or an exposure degree of content displayed on the display depending on either (i) magnitude of a change rate of an interest degree of the audience member or (ii) magnitude of an interest degree of the audience member. Accordingly, the information displaying apparatus 10 can dynamically provide information presented to the audience member via the content depending on an audience state. As a result, the information displaying apparatus 10 can arouse an interest of the audience member more efficiently, as well as significantly impress the audience member with information presented by the content.

[Embodiment 2]

Described next in detail is Embodiment 2 of the present invention with reference to the drawings.

An information displaying apparatus 20 according to Embodiment 2 of the present invention chiefly differs from the information displaying apparatus 10 according to Embodiment 1 in that the information displaying apparatus 20 selects a targeted audience member from among audience members positioned in front of a display.

Figure 8:
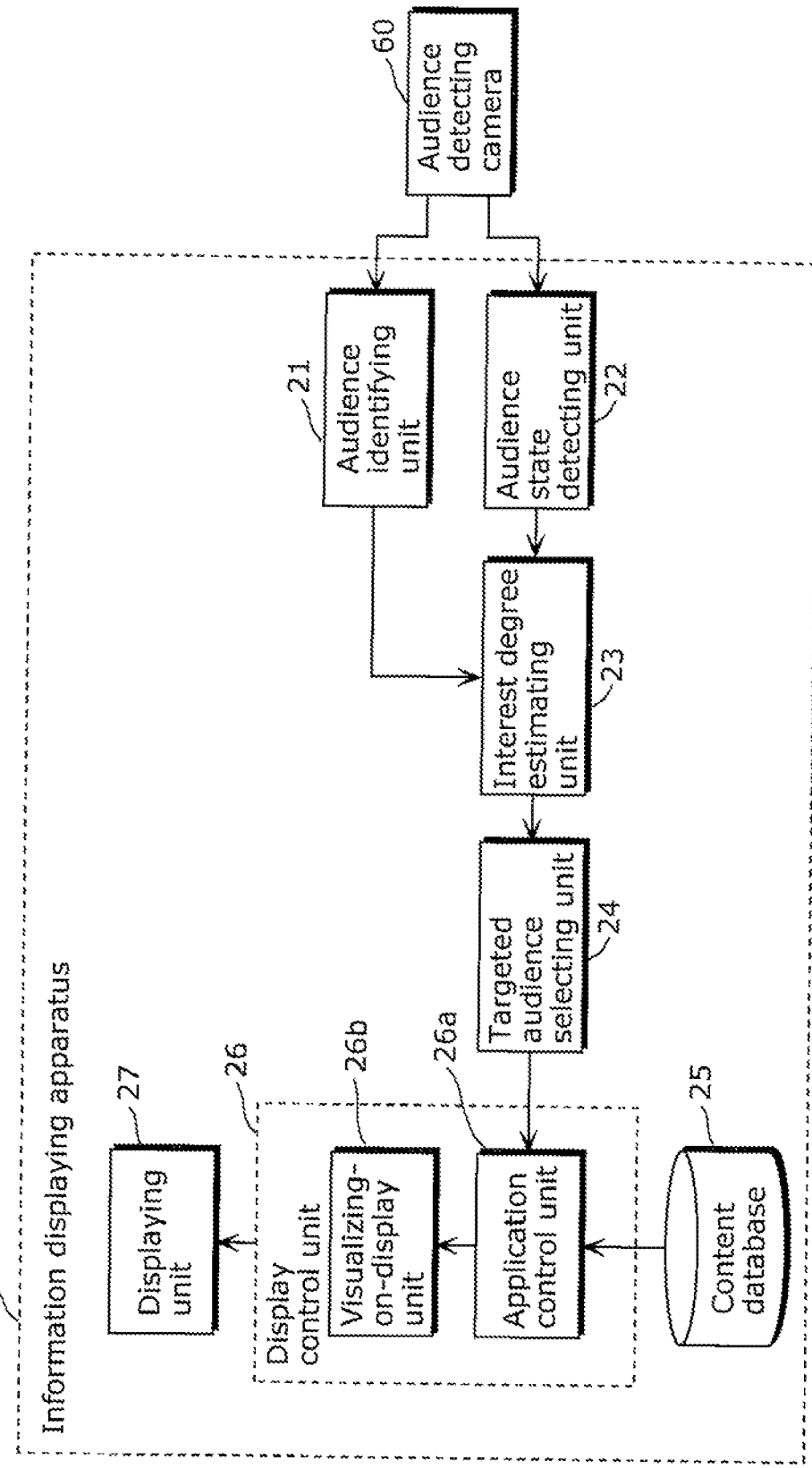
FIG. 8 is a block diagram showing a functional structure of an information displaying apparatus according to Embodiment 2 of the present invention.

FIG. 8 is a block diagram showing a functional structure of an information displaying apparatus according to Embodiment 2 of the present invention.

As shown in FIG. 8, the information displaying apparatus 20 includes the following: an audience member identifying unit 21 used for obtaining image information from audience detecting cameras 60; an audience state detecting unit 22; an interest degree estimating unit 23; a targeted audience member selecting unit 24; a content database 25; a display control unit 26; and a displaying unit 27.

At least two of the audience detecting cameras 60 are placed around the display of the displaying unit 27. In other words, the audience detecting cameras 60 includes a first audience detecting camera 60*a* and a second audience detecting camera 60*b*. Each of the audience detecting cameras 60 is equipped with an image sensor and an optical system, such as a Charge Coupled Device (CCD) and a Complementary Metal Oxide Semiconductor (CMOS).

The first audience detecting camera 60*a* and the second audience detecting camera 60*b* simultaneously photograph an audience member found in front of the display. Then, the first audience detecting camera 60*a* and the second audience detecting camera 60*b* provide image information on the captured image to the audience member identifying unit 21 and the audience state detecting unit 22.

The audience member identifying unit 21 extracts a face region out of the image indicated in the image information obtained from the audience detecting cameras 60. Then, the audience member identifying unit 21 provides audience member identifying information for extracted each face region. Here, the audience member identifying information indicates a characteristic of the face region and is used for specifying the audience member.

The audience state detecting unit 22 detects an audience state representing a physical state of an audience member positioned in front of the display.

Specifically, the audience state detecting unit 22 employs a corresponding relationship between areas having the audience member (hereinafter referred to as "audience areas") and provided on images captured by the first audience detecting camera 60*a* and the second audience detecting camera 60*b* to calculate a relative position found between the audience member and the display for each audience member. In other words, the audience state detecting unit 22 takes advantage of a parallax difference developed of stereo disparity to detect the position of each audience member as an audience state. Further, the audience state detecting unit 22 detects a traveling vector of the audience member (a traveling direction and a traveling speed of the audience member) based on a time varied position of the detected audience member.

Figure 9A:
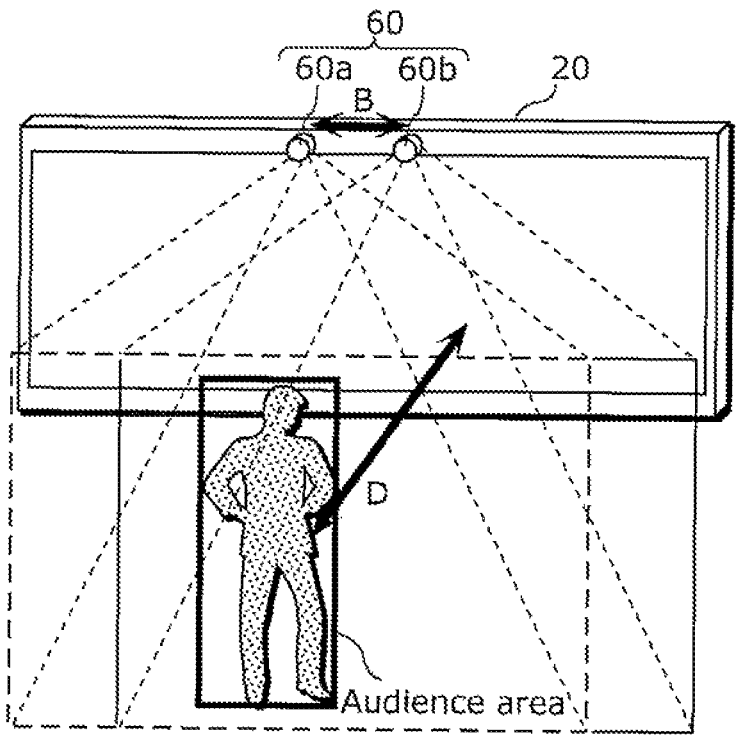
FIG. 9A shows an audience member position calculating technique according to Embodiment 2 of the present invention.
Figure 9B:
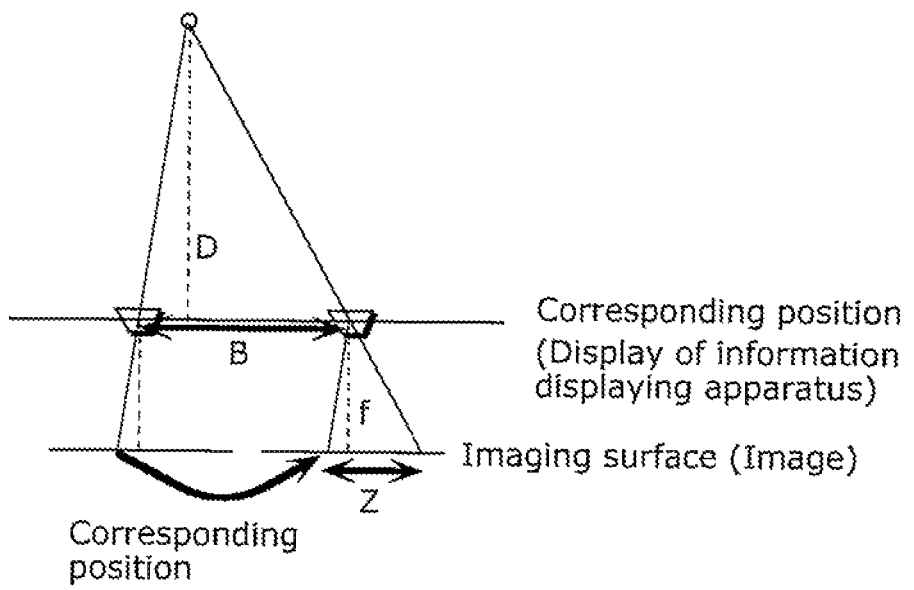
FIG. 9B shows the audience member position calculating technique according to Embodiment 2 of the present invention.
Figure 11:
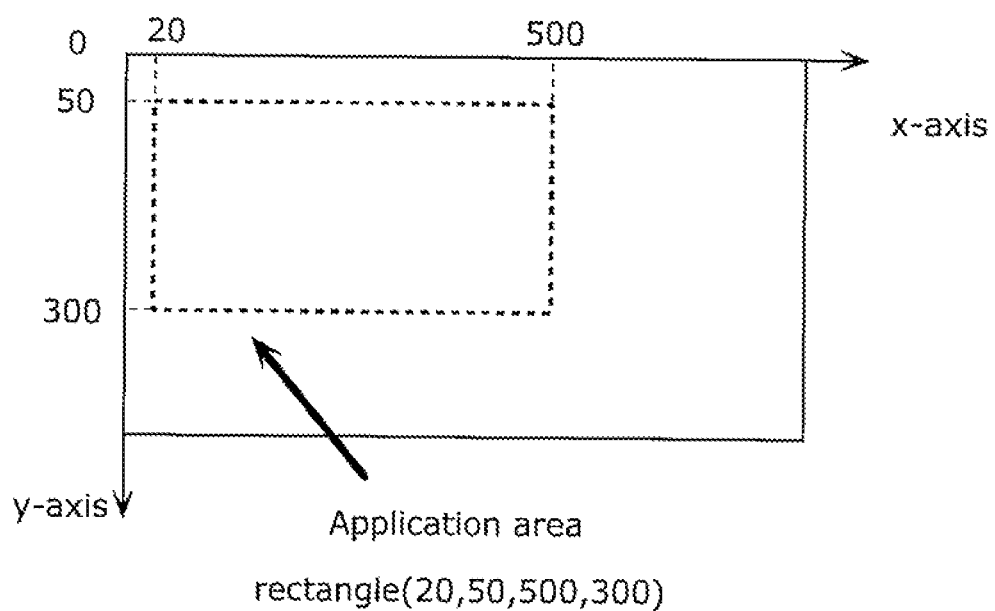
FIG. 11 shows an application area.

FIGS. 9A and 9B show an audience member position calculating technique according to Embodiment 2 of the present invention.

As shown in FIG. 9A, the first audience detecting camera 60a and the second audience detecting camera 60b are placed apart each other in distance "B" and in parallel to the display of the information displaying apparatus 20. Specifically, the first audience detecting camera 60a and the second audience detecting camera 60b are placed with (i) optical axes thereof observed each other (a) in parallel and apart in distance "B", and (b) running vertically to the display, and (ii) optical centers thereof positioned on a plane including the display.

The audience state detecting unit 22 extracts the audience area found in the image captured by each of the audience detecting cameras 60. Then, the audience state detecting unit 22 calculates distance "D" found between the audience member and the display of the information displaying apparatus 20 based on a position mismatch between the audience areas found on the corresponding images. Specifically, the audience state detecting unit 22 has previously stored an image, having no audience member, captured by each of the audience detecting cameras 60. When an audience member appears in a capturing range (an audience detectable area), the audience state detecting unit 22 calculates the difference between the captured images and the stored images to extract the audience area. Moreover, the audience state detecting unit 22 can also extract is as the audience area an audience member's face region obtained through detection and matching of a face image.

FIG. 9B shows a principle of range finding employing stereo disparity in order to obtain the distance "D" found between the audience member and a camera mounting space (the display of the information displaying apparatus 20) based on a positional relationship between the audience areas found on corresponding two images. As shown in FIG. 9B, each of audience member images; namely a position measurement target, is projected on an imaging surface for an associated image sensor of the first audience detecting camera 60a and of the second audience detecting camera 60b. Assume the mismatch observed between the projected images of the position measurement target as "Z". The audience state detecting unit 22 employs focal point distance of the cameras "f" and the distance between the optical axes "B" to calculate the distance "D" found between the audience member and the display of the information displaying apparatus 20 as shown in Expression (2).

$$D = f \frac{B}{Z} \qquad \text{Expression 2}$$

The audience state detecting unit 22 can also calculate an audience member positioned in parallel to the display of the information displaying apparatus 20 based on the position of the audience area found in the images and the distance "D" calculated with Expression (2). As described above, the audience state detecting unit 22 calculates to provide a relative position of the audience member with respect to the information displaying apparatus 20.

In addition, the audience state detecting unit 22 calculates a traveling vector of the audience member based on a temporal change of the above-described calculated position. Specifically, the audience state detecting unit 22 stores for each audience member a calculated position of the audience member, and calculates for each audience member a traveling vector of the audience member using the stored calculated position of the audience member.

It is noted that the audience state detecting unit 22 does not necessarily employ the stereo disparity for calculating a position of an audience member. For example, the audience state detecting unit 22 may employ distance information obtained out of the principle of Time of Flight for calculating a relative position of an audience member and the information displaying apparatus 20. Here, at least one audience detecting camera 60 equipped with a distance image sensor is placed. The distance image sensor employs the principle of Time of Flight to provide distance information.

The audience state detecting unit 22 may use a floor pressure sensor to obtain a relative position of the audience member with respect to the information displaying apparatus 20. The floor pressure sensor is installed in the floor found in front of the display. Here, no audience detecting cameras 60 are required.

Based on the audience member position provided by the audience state detecting unit 22, the interest degree estimating unit 23 estimates an interest degree of the audience member in the displayed content for each audience member specified with the audience member identifying information. A calculating technique of the interest degree shall be described later.

Based on the interest degree of each audience member provided by the interest degree estimating unit 23, the targeted audience member selecting unit 24 selects a targeted audience member. When an interest degree in displayed content is equal to or above a fourth threshold predetermined for each piece of displayed content, the targeted audience member selecting unit 24 selects an audience member suitable for the interest degree as a targeted audience member. Here, the fourth threshold is a value indicating that the audience member is interested in the displayed content to some degree. In other words, the fourth threshold is a value used for selecting an audience member whose interest degree potentially increases when the clarity degree or the exposure degree of the content decreases.

When the distance between the position of an audience member and the center of displayed content is smaller than a fifth threshold which is predetermined for each piece of displayed content, the targeted audience member selecting unit 24 may select the audience member as a targeted audience member. Here, the fifth threshold is distance indicating that the audience member is interested in the displayed content to some degree. In other words, the fifth threshold is distance employed for selecting an audience member whose interest degree potentially increases when the clarity degree or the exposure degree of the content decreases.

The content database 25 stores, for each interest degree level indicating an audience member's interest degree, content and the type of a visual effect applied to the content as well as the application area of the visual effect.

FIG. 10 exemplifies a content database according to Embodiment 2 of the present invention. As shown in FIG. 10, the content database 25 stores for each interest degree level content associated with a visual effect and an application area. FIG. 10 exemplifies the case where the content stored in the content database 25 relates to an advertisement of a product "TV" named "ABCD".

The content in an interest degree level "1" shows an advertising person as the face of the product "TV". The content in an interest degree level "2" shows the person slightly smaller than the interest degree level "1" does. Instead, the content in the interest degree level "2" presents an image of the product on the top left. The content in an interest degree level "3"

shows the product lineup. As an interest degree of the audience member increases, content having more detailed product information is stored. Hence, the information displaying apparatus 20 can provide more detailed information as the interest degree of the audience member increases, and attract the audience member's attention to the advertisement.

The visual effect is employed to reduce a clarity degree or an exposure degree of the content. For example, the visual effect includes "hiding" used for hiding the content or "blur" for blurring the content. "Blur" (30) indicates that the intensity of the blurring is "30". In other words, "blur (75)" makes content more blurring than "blur (30)" does. Hence, the content database 25 preferably stores an intensity of a visual effect as well as a type of the visual effect.

An application area of a visual effect may be the entire content "all" or a part of the content. For example, "rectangle (20, 50, 500, 300)" represents a rectangular area. One of the vertices of the rectangular area has coordinates (20, 50) and another one of the vertices which is found opposite the vertex has coordinates (500, 300). In a frame of reference designating top left of displayed content as the origin of coordinates, "rectangle (20, 50, 500, 300)" shows a rectangular area having a top-left vertex of x-coordinate 20 and y-coordinate 50, and a bottom-right vertex of x-coordinate 500 and y-coordinate 300.

Assume that the displayed content is an advertisement of a product. When the application area, receiving the visual effect used for reducing a clarity degree or an exposure degree, presents information essential to appeal the product, such as a product name and an advertising person as the face of the product, a kind of teasing effect can be provided to the audience member. Hence, the information displaying apparatus 20 can attract the audience member's attention. In other words, when the application area is an area presenting essential information, the teasing effect is developed to arouse an interest of the audience member. On the contrary, when the application area; that is an area receiving a visual effect used for reducing a clarity degree or a exposure degree, is an area other than presenting essential information, the information displaying apparatus 20 can clearly present the essential information alone while leaving the entire information unrecognizable. This can attract the audience member's attention.

In the case where magnitude of a change rate of an interest degree estimated by the interest degree estimating unit 23 is smaller than the first threshold, the display control unit 26 causes the displaying unit 27 to display content which differs from content currently displayed on the display. Here, a clarity degree or an exposure degree of at least a part of the different content is reduced below a predetermined clarity degree or a predetermined exposure degree. The display control unit 26 includes an application control unit 26*a* and a visualizing-on-display unit 26*b*.

When updating details of an image provided on the display of the displaying unit 27, the application control unit 26*a* provides to the visualizing-on-display unit 26*b* update information on the update of the detail of the image.

Based on the update information, the visualizing-on-display unit 26*b* visualizes content to be displayed on the displaying unit 27, and provides the visualized content to the displaying unit 27.

The displaying unit 27 has a display, and displays on the display the content visualized by the visualizing-on-display unit 26*b*.

Described next are operations on the information displaying apparatus 20 structured above. In order to describe the operations on the information displaying apparatus 20, exemplified is a case where two or more audience members are found in front of the information displaying apparatus 20

Figure 12:
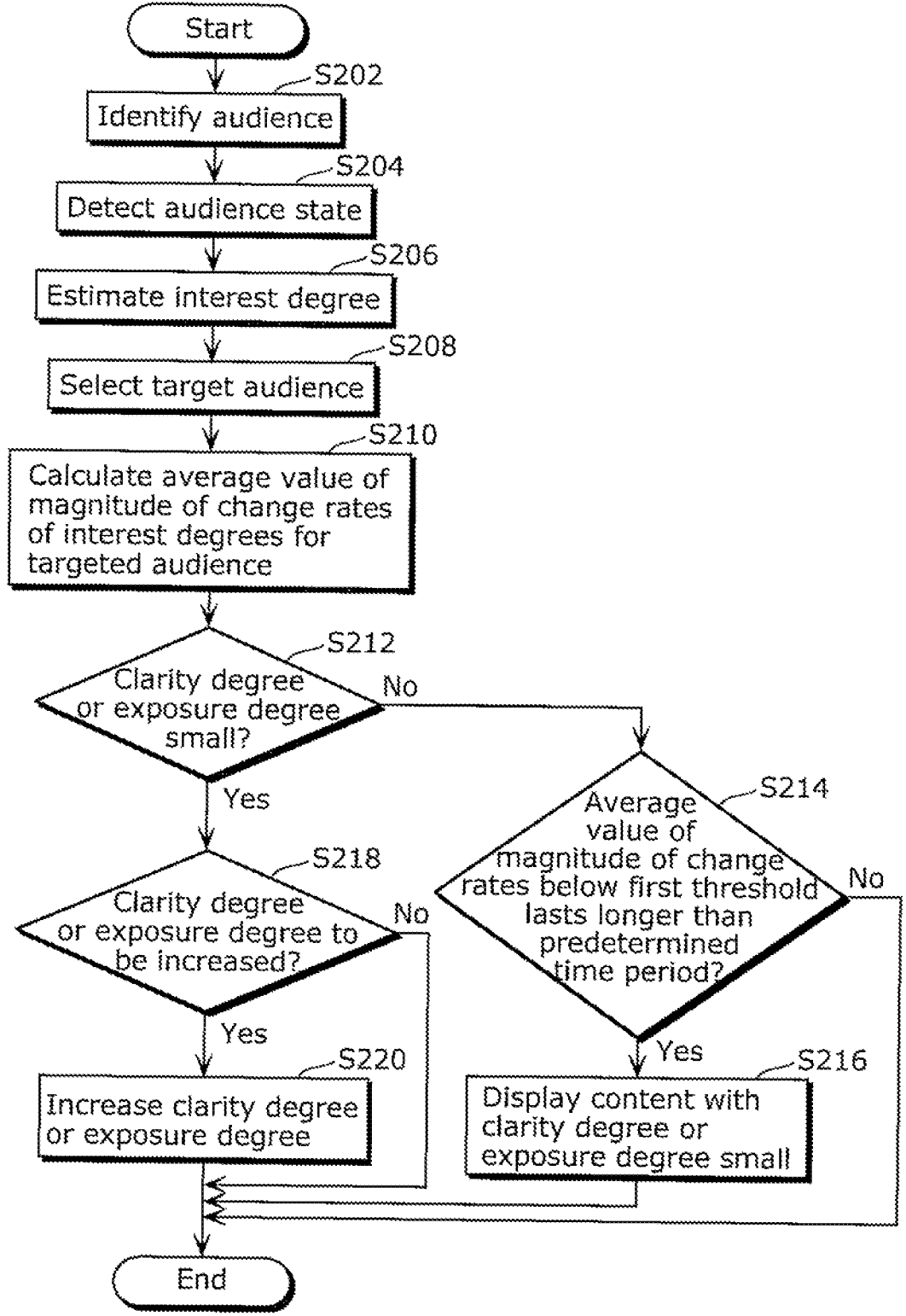
FIG. 12 is a flow chart showing a flow of a process executed on the information displaying apparatus according to Embodiment 2 of the present invention.
Figure 13:
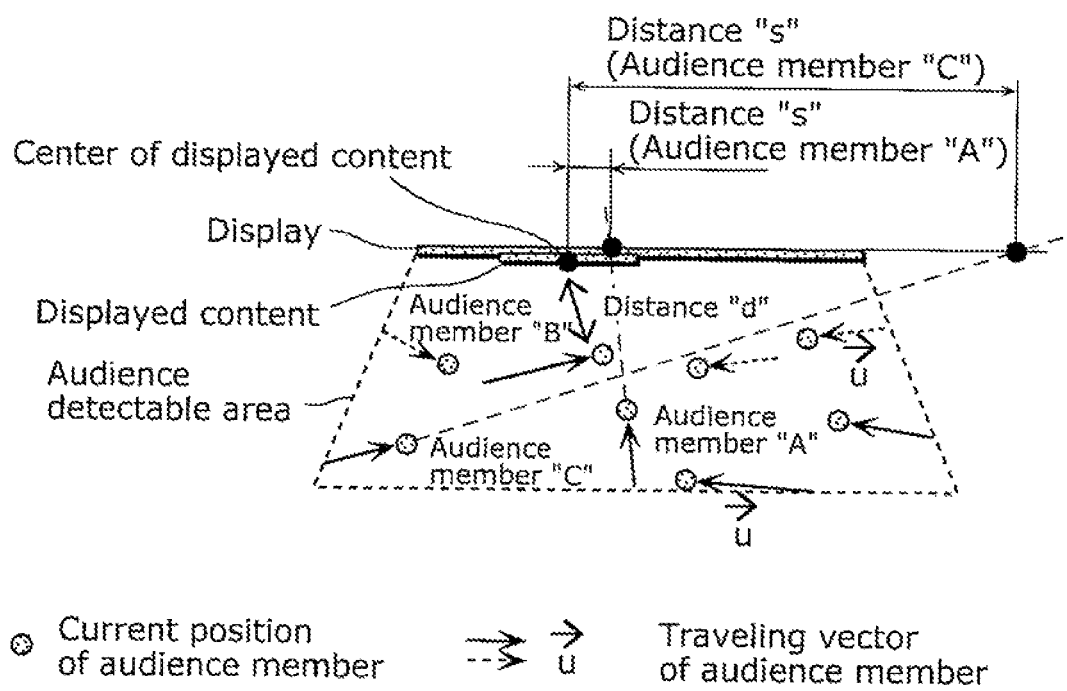
FIG. 13 shows an interest degree calculating technique according to Embodiment 2 of the present invention.
Figure 14A:
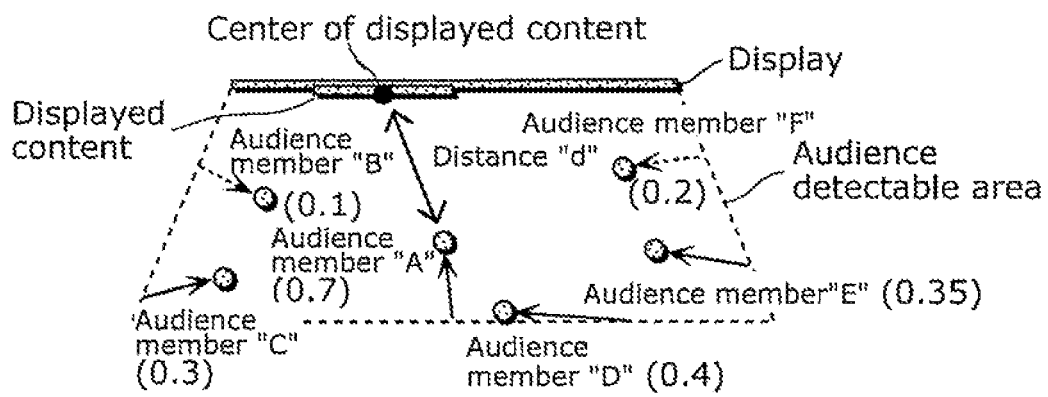
FIG. 14A shows a targeted audience member selecting technique according to Embodiment 2 of the present invention.
Figure 14B:
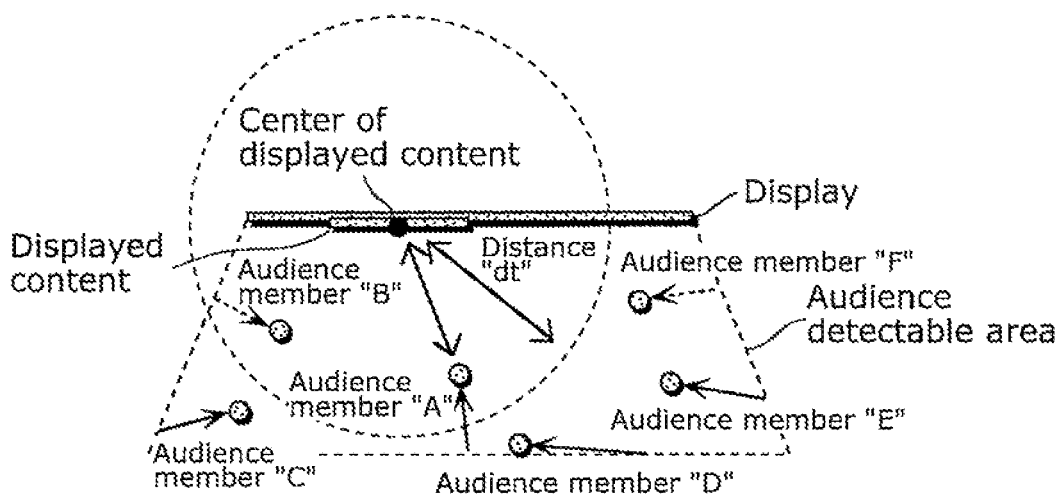
FIG. 14B shows the targeted audience member selecting technique according to Embodiment 2 of the present invention.

FIG. 12 is a flow chart showing a flow of a process executed on the information displaying apparatus according to Embodiment 2 of the present invention. FIG. 13 shows an interest degree calculating technique according to Embodiment 2 of the present invention. FIGS. 14A and 14B show a targeted audience member selecting technique according to Embodiment 2 of the present invention.

First, the audience member identifying unit 21 extracts a face region out of images captured by the audience detecting cameras 60 to generate audience member identifying information used for specifying an audience member.

Then, the audience state detecting unit 22 extracts audience areas out of images captured by the audience detecting cameras 60, and detects an audience state for each extracted audience area. Specifically, the audience state detecting unit 22 calculates a position of an audience member for each audience area. Based on a temporal change of the calculated audience member's position, furthermore, the audience state detecting unit 22 calculates a traveling vector of the audience member.

The interest degree estimating unit 23 calculates an interest degree "k" of the audience member in displayed content according to Expression 3 (S206) using the following information: a traveling vector of the audience member;
$\vec{v}$ distance "s" between (i) a point at which
$\vec{u}$ and the display intersect and (ii) the center of the displayed content; and distance "d" between the position of the audience member and the center of the displayed content.

$$k = g1 * \frac{1}{s+1} + g2 * \frac{1}{|\vec{u}|} + g3 * \frac{1}{d} \qquad \text{Expression 3}$$

Here, "g1", "g2", and "g3" are gains and real numbers equal to 0 or greater.

The first term of the right side of Expression 3 indicates a traveling direction of an audience member. In the first term, an interest degree of an audience member increases as the audience member travels closer to the displayed content.

When extended in a traveling direction, a traveling vector shown in FIG. 13 in solid line intersects with the display or a plane as an extension of the display. Concurrently, a traveling vector shown in FIG. 13 in broken line does not intersect with the display or a plane as an extension of the display even though extended in a traveling direction.

The distance "s" between (i) the point at which
$\vec{u}$ and the display intersect and (ii) the center of the displayed content decreases as the audience member travels closer to the displayed content. As a result the value of the first term increases. According to the first term, the interest degree of the audience member increases as the traveling direction of the audience member is closer to the center of the displayed content.

It is noted in FIG. 13 that only audience members "A" and "C" have the distance "s" lying between (i) the point at which
$\vec{u}$ and the display intersect and (ii) the center of the displayed content. Simultaneously, distance "s" for the other audience members is also calculated in the same manner as the distance "s" is calculated for the audience members "A" and "C". On the other hand, a traveling vector showing distance "s" of an audience member "B" does not intersect with the display or a plane as an extension of the display even though the traveling vector is extended in a traveling direction. Accordingly, the distance "s" is infinite (∞). Thus, the first term is 0 even though "g1" is 1.

In FIG. 13, the distance "s" represents the distance between (i) the point at which the traveling vector of the audience member and the display intersect and (ii) the center of the displayed content. The distance "s" may also represent distance between (i) the point at which the traveling vector of the audience member and the display intersect and (ii) the center of the display. Here, the interest degree increases as the audience member travels closer to the center of the display. The distance "s" may as well represent distance between (i) the point at which the traveling vector of the audience member and the display intersect and (ii) the center of the image presented in a part of the displayed content. Here, the interest degree increases as the audience member travels closer to the center of the image presented in the part of the displayed content.

The second term of the right side of Expression 3 represents a speed of an audience member. In the second term, an interest degree of an audience member increases as the audience member travels slower.

The third term of the right side of Expression 3 represents distance between a position of an audience member and the center of displayed content. In the third term, an interest degree of an audience member increases as a position of the audience member is closer to the displayed content.

Next, the targeted audience member selecting unit 24 selects a targeted audience member (S208). Specifically, the targeted audience member selecting unit 24 selects, for example, as the targeted audience member an audience member whose interest degree "k" is equal to or greater than the predetermined fourth threshold "kTH". Assume, for example, that the fourth threshold "kTH" is set to "0.4". The targeted audience member selecting unit 24 selects as targeted audience members the "audience member A" having an interest degree of "0.7" and the "audience member D" having an interest degree of "0.4".

It is noted that the targeted audience member selecting unit 24 may select as a targeted audience member an audience member whose distance "d" from the center of displayed content is smaller than the predetermined fifth threshold. Here, in FIG. 14B for example, the targeted audience member selecting unit 24 selects as targeted audience members the "audience member A" and the "audience member B" whose distance "d" from the center of the displayed content is smaller than the fifth threshold "dt".

Figure 15:
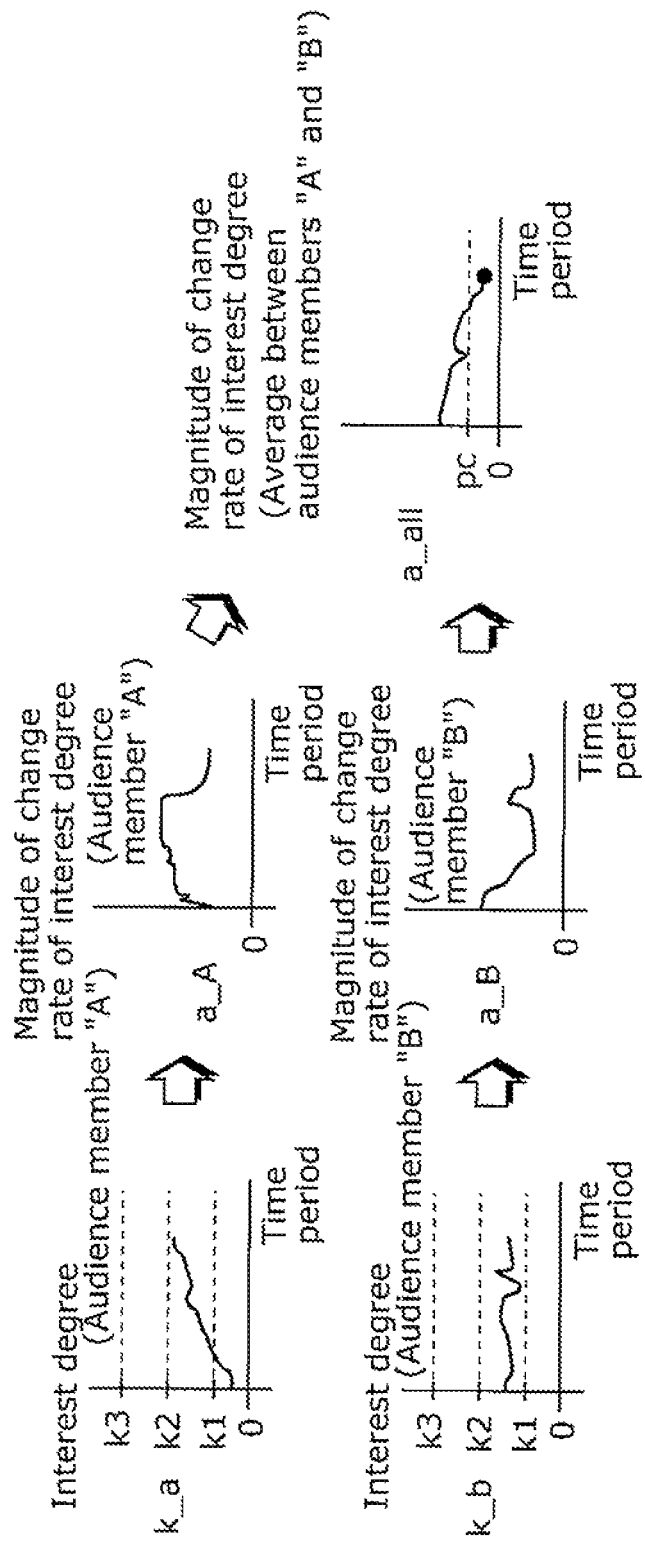
FIG. 15 shows how a change rate of the interest degree is calculated according to Embodiment 2 of the present invention.

Next, the display control unit 26 calculates an average value of the magnitudes of the change rates of the interest degrees for the targeted audience members (S210). Specifically, the display control unit 26 calculates, at a current time "t", magnitude of a change rate of an interest degree each targeted audience member in a predetermined time period "Δt". When Step S208 involves selecting the "audience member A" and the "audience member B" as targeted audience members, for example, the display control unit 26 calculates, as shown in FIG. 15 and Math 4, the magnitudes of the change rates of the interest degrees of the "audience member A" and the "audience member B"; namely "a_A(t)" and "a_B(t)", using the calculated interest degrees of the "audience member A" and the "audience member B"; namely "k_a" and "k_b".

$$a\_A(t) = \left| \frac{k\_a(t) - k\_a(t - \Delta t)}{\Delta t} \right|$$

$$a\_B(t) = \left| \frac{k\_b(t) - k\_b(t - \Delta t)}{\Delta t} \right|$$

Expression 4

Then, the display control unit 26 calculates the average value of the magnitudes ("a_A" and "a_B") of the change rates of the interest degrees of the audience member A and the audience member B as the average value "a_all" of the magnitudes of the change rates of the interest degrees of the targeted audience members.

Next, the display control unit 26 determines whether or not the clarity degree or the exposure degree of at least a part of the content displayed on the displaying unit 27 is smaller than a predetermined clarity degree or a predetermined exposure degree (S212).

When the clarity degree or the exposure degree is greater than the predetermined clarity degree or the predetermined exposure degree (S212: No), the display control unit 26 determines whether or not a state in which the average value "a_all" of the magnitudes of the change rates of the interest degrees is below the first threshold lasts longer than a predetermined time period (S214).

When the state in which the average value "a_all" of the magnitude of the change rate of the interest degree is below the first threshold does not last as long as the predetermined time period (S214: No), the process ends. Concurrently, when the state in which the average value "a_all" of the magnitudes of the change rates of the interest degrees is below the first threshold lasts as long as the predetermined time period or longer (S214: Yes), the display control unit 26 displays content suitable to the calculated interest degree with the clarity degree or the exposure degree of at least a part of the content smaller than the predetermined clarity degree or the predetermined exposure degree (S216). Specifically, the display control unit 26 refers to the content database 25 to obtain content and a visual effect which are suitable to a calculated interest degree. Then, the display control unit 26 displays the obtained content as well as applies the obtained visual effect to the content. Here, the clarity degree or the exposure degree of the content is reduced when the state in which the average value "a_all" of the magnitudes of the change rates of the interest degrees is below the first threshold lasts as long as the predetermined time period or longer. This is because the reduction of the clarity degree or the exposure degree is regarded effective (or, is essential) in increasing the audience members' interest degrees.

When the clarity degree or the exposure degree is below the predetermined clarity degree or the exposure degree (S212: Yes), the display control unit 26 determines whether or not the clarity degree or the exposure degree should be increased (S218). Specifically, the display control unit 26 determines whether or not the clarity degree or the exposure degree should be raised depending whether or not the magnitude of the change rate of the interest degree estimated by the interest degree estimating unit 23 is greater than the second threshold, for example. The display control unit 26 also determines whether or not the clarity degree or the exposure degree should be raised depending whether or not the interest degree estimated by the interest degree estimating unit 23 is greater than the third threshold.

When determining the clarity degree or the exposure degree to be raised (S218: Yes), the display control unit 26 raises the clarity degree or the exposure degree of the displayed content (S200), and the process ends. Specifically, the display control unit 26 removes the visual effect applied to the content displayed on the display. When the clarity degree or the exposure degree is determined not to be raised (S218: No), the process ends.

Executing the process including Steps S202 through S220, the information displaying apparatus 20 can change a clarity degree or an exposure degree of at least a part of content depending on the interest degree of a targeted audience member. It is noted that the information displaying apparatus 20 may repeatedly execute the process including Steps S202 through S220.

Described hereinafter in detail is a flow of the process shown in FIG. 12.

Figure 16:
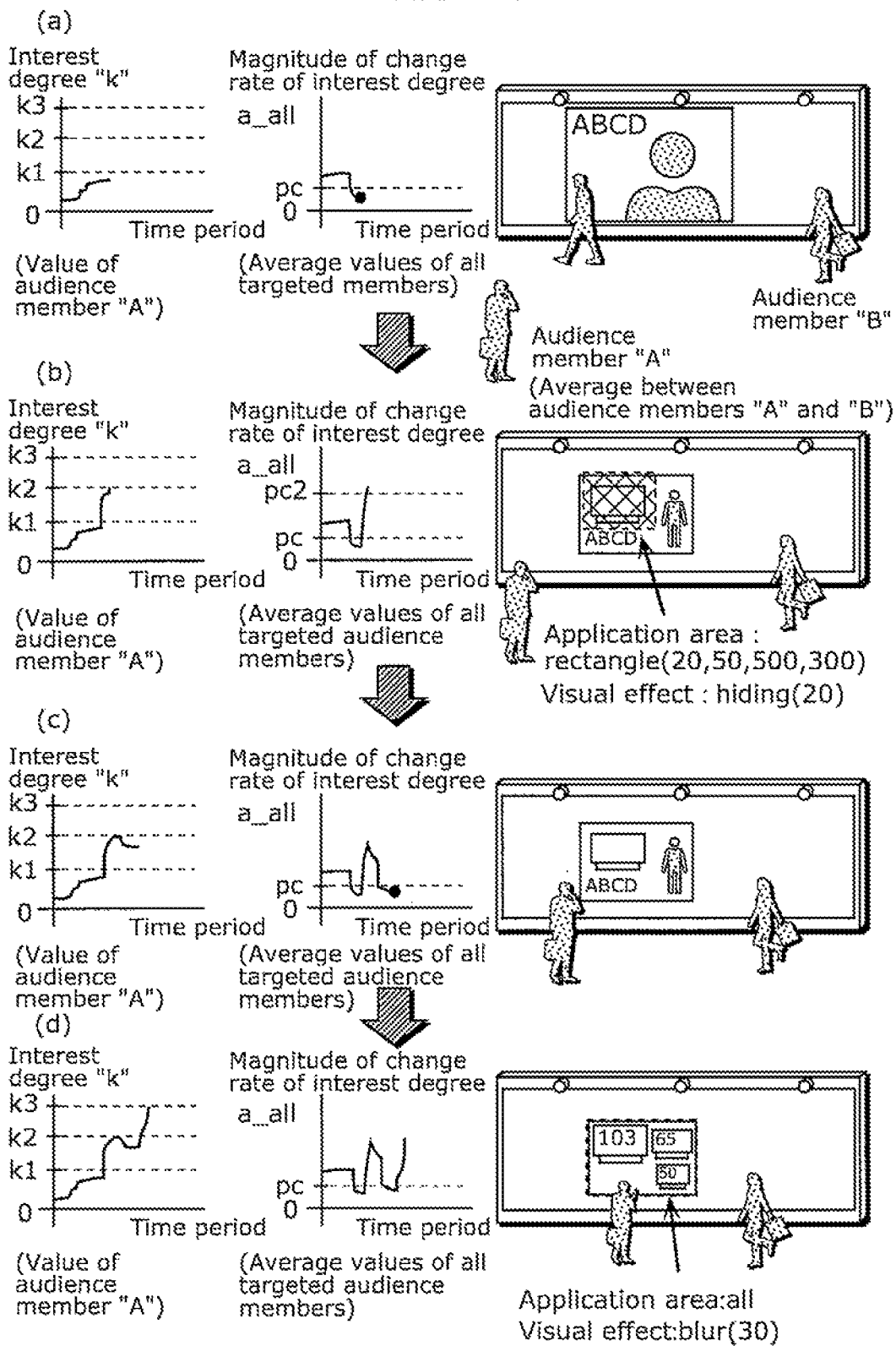
FIG. 16 specifically exemplifies an operation of the information displaying apparatus according to Embodiment 2 of the present invention.

FIG. 16 specifically exemplifies an operation on the information displaying apparatus according to Embodiment 2 of the present invention. In FIG. 16, an advertisement of the product "TV" is presented on a part of the display. Based on the interest degree of the "audience member A", the information displaying apparatus 20 displays on the display the content stored in the content database 25 shown in FIG. 10. In FIG. 16(a), for example, the interest degree of the "audience member A" is found within a range between "0" and "k1". Thus displayed on the display is the content for the interest degree level "1".

The situation in FIG. 16(a) shows a steady increase in the interest degree of the targeted audience member, followed by the interest degree going to a plateau. In other words, the situation in FIG. 16(a) shows that the change rate of the interest degree of the targeted audience member is small and the change in the interest degree has leveled. This situation indicates the fact that the targeted audience member has been interested in the displayed content to some degree; however, the target audience member will not show any further interest. In other words, the targeted audience member has possibly judged that the information presented by the displayed content is not interesting enough for the audience member to pay further attention to the displayed content. In such a situation, applying the visual effect to a part of or the whole displayed content (advertisement) additionally stimulates the audience member to arouse his or her further interest in the displayed content (advertisement).

FIG. 16(a) shows that the magnitude of the change rate of the interest degree of the targeted audience member remains below the first threshold "pc" for the predetermined time period. Thus, as shown in FIG. 16(b), the display control unit 26 displays the content stored in the content database 25 so that a part or the entire clarity degree or a part or the entire exposure degree of the displayed content is below a predetermined clarity degree or a predetermined exposure degree. Specifically, the display control unit 26 (i) selects, as the displayed content, the content having the interest degree level "2" which is the next greater interest degree level than the current interest degree level, and (ii) applies an visual effect "hiding (20)" to an application area "rectangle (20, 50, 500, 300)" of the displayed content. As a result, the exposure degree decreases in a part where the product "TV" is presented in the displayed content. This draws the audience member's attention to the blurring part.

Then, once the magnitude of the change rate of the interest degree exceeds the second threshold "pct", the display control unit 26 raises the reduced exposure degree as shown in FIG. 16(c). Specifically, the display control unit 26 removes the visual effect applied to the content. The display control unit 26 may raise the exposure degree of the content when the interest degree exceeds "k1", for example.

In FIG. 16(c), the interest degree is found within a rage between "k1" and "k2". Similar to the case observed in FIG. 16(a), the magnitude of the change rate of the interest degree of the targeted audience member remains below a threshold "pc" for a predetermined time period. Then, the display control unit 26 (i) selects, as the displayed content, the content having the interest degree level "3" shown in FIG. 16(c), and (ii) applies a visual effect "blur (30)" to an application area "all" of the displayed content. As a result, the entire displayed content briefly blurs, and the clarity degree thereof decreases. This draws the audience member's attention again to the displayed content.

FIG. 16 exemplifies in FIG. 16(a) and FIG. 16(b) that the display control unit 26 reduces the displaying area of the displayed content (advertisement) as the "audience member A" approaches closer to the display or the displayed content. This operation allows the "audience member A" to see the entire displayed content more clearly, and arouses the interest of the "audience member A" in the displayed content.

As described above, the display control unit 26 preferably controls a position or a size of an area of the display on which content is displayed based on a position of at least one of the targeted audience members. As a position of at least one of the targeted audience members is closer to the position where the content is displayed, for example, the display control unit 26 preferably displays the content so that the area in which the content is displayed becomes small. Furthermore, as a position of at least one of the targeted audience members is closer to the position where the content is displayed, for example, the display control unit 26 preferably displays the content so that a position of an area in which the content is displayed is closer to the audience member.

As described above, the information displaying apparatus 20 according to Embodiment 2 can change a clarity degree or an exposure degree of content based on an audience member state of a targeted audience member selected from among audience members found in front of the display. Thus, the information displaying apparatus 20 can efficiently arouse an interest of an audience member selected as the targeted audience member.

Moreover, the information displaying apparatus 20 can select, as the targeted audience member, an audience member whom the teasing effect can highly possibly interest. Thus, the information displaying apparatus 20 can efficiently arouse an interest of the audience member.

It is noted that the visual effect shall not be limited to the ones described above. Another visual effect may be employed as far as the effect can reduce a clarity degree or an exposure degree of displayed content to briefly tease the audience member. For example, the visual effect may employ a sign or a material which can easily attract the audience member's attention.

It is noted that Embodiment 2 has introduced advertisement-related content to exemplify the displayed content using; meanwhile, an information displaying apparatus according to an aspect of the present invention does not necessarily display advertisement-related content. The information displaying apparatus may display any content which will be effective once an interest of the audience member arises.

Figure 17A:
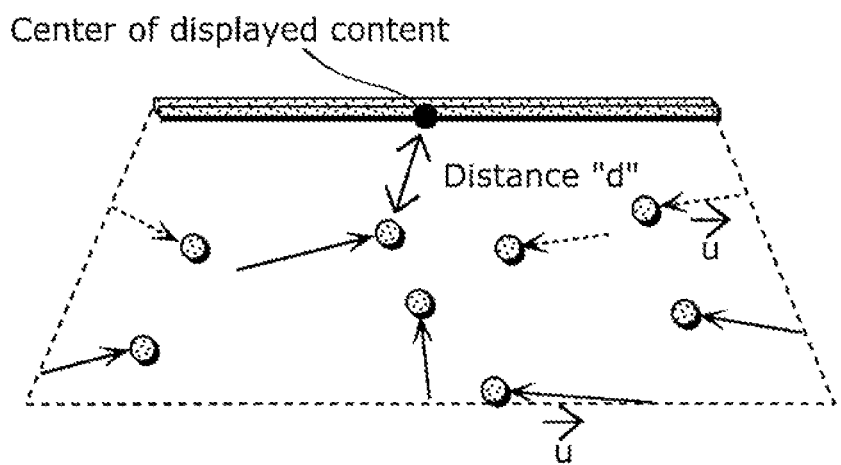
FIG. 17A exemplifies another content displaying technique according to Embodiment 2 of the present invention.
Figure 17B:
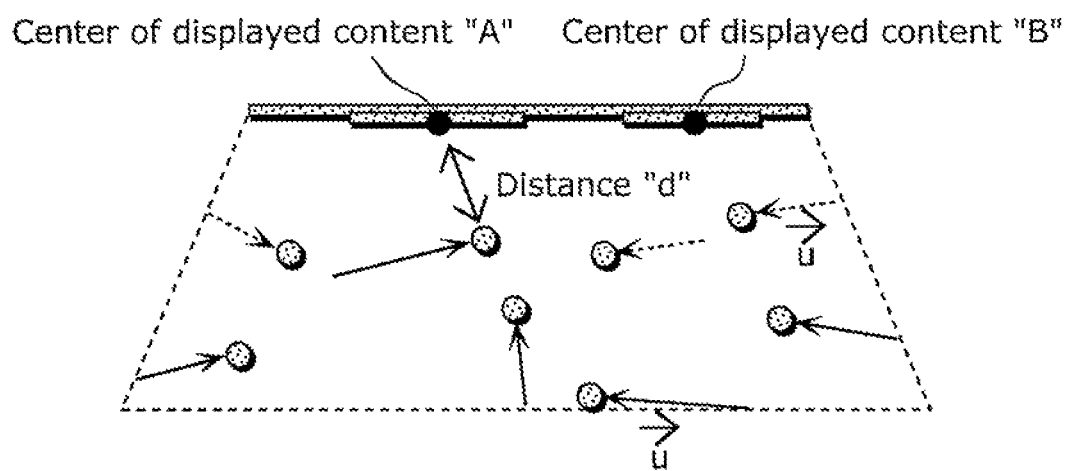
FIG. 17B exemplifies another content displaying technique according to Embodiment 2 of the present invention.

In Embodiment 2, the content is displayed on a part of an area on the display; meanwhile, the content may be displayed on the whole display as shown in FIG. 17A. In Embodiment 2, one piece of content is displayed on the display; meanwhile, two or more pieces of content (displayed content "A" and displayed content "B") may be displayed on the display. Here, the information displaying apparatus 20 preferably executes the process described in FIG. 12 for each piece of content.

In Embodiment 2, the interest degree estimating unit 23 uses all of the following factors to estimate an interest degree: a traveling direction of an audience member; a traveling speed of the audience member; and a position of the audience member. Meanwhile, the interest degree estimating unit 23 may use at least one of the above factors to estimate an interest degree. For example, when the gain "g1" and the gain "g2" are 0 in Expression 3, the interest degree estimating unit 23 can calculate the interest degree "k" based only on the distance between the position of the audience member and the center of the displayed content.

[Modification of Embodiment 2]

The information displaying apparatus 20 according to Modification of Embodiment 2 differs from the information displaying apparatus 20 according to Embodiment 2 in that the former information displaying apparatus 20 estimates an interest degree using an eye-gaze direction of an audience member. Mainly focusing on the points different from Embodiment 2, described hereinafter is Modification with reference to the drawings.

Similar to the information displaying apparatus 20 according to Embodiment shown in FIG. 8, the information displaying apparatus 20 according to Modification includes the following: the audience member identifying unit 21; the audience state detecting unit 22; the interest degree estimating unit 23; the targeted audience member selecting unit 24; the content database 25; the display control unit 26; and the displaying unit 27. It is noted that the constituent elements other than the audience state detecting unit 22 and the interest degree estimating unit 23 are similar to those in Embodiment 2. Thus, description thereof shall be omitted.

The audience state detecting unit 22 further detects an eye-gaze direction of an audience member as the audience state. A specific eye-gaze direction detecting technique shall be described hereinafter.

The interest degree estimating unit 23 for example estimates that an interest degree of an audience member is higher as the eye-gaze direction of the detected audience member is more similar to a direction from the audience member to either (i) a position of the display or (ii) a position at which the content is displayed. Specifically, the interest degree estimating unit 23 calculates the interest degree using Expression 5. Expression 5 additionally has the fourth term in the right side of Expression 3. Here, the fourth term indicates an eye-gazing direction of the audience member. The fourth term of Expression 5 represents a reciprocal of a value indicating the distance "t" with 1 added. Here, the distance "t" lies between (i) a point at which an eye-gaze direction vector $\vec{v}$ and the display intersect and (ii) the center of the displayed content. Here, the eye-gaze direction vector is a unit vector showing an eye-gaze direction of the audience member. The value becomes great as the audience member takes a closer look into $$k = g1 * \frac{1}{s+1} + g2 * \frac{1}{|\vec{u}|} + g3 * \frac{1}{d} + g4 * \frac{1}{t+1} \quad \text{Expression 5}$$

Here, "g4" is a gain so are "g1", "g2", and "g3". "g4" is also a real number equal to 0 or greater.

It is noted that the distance "t" may lies between (i) a point at which the eye-gaze direction vector and the display intersect and (ii) the center of the display instead of lying between (i) the point at which the eye-gaze direction vector and the display intersect and (ii) the center of the displayed content. Here, the interest degree becomes great as the audience member takes a closer look into the direction toward the center of the display. The distance "t" may as well represent distance between (i) the point at which the eye-gaze direction vector and the display intersect and (ii) the center of the image presented in a part of the displayed content. Here, the interest degree becomes great as the audience member takes a closer look into the direction toward the center of the image presented in a part of the displayed content.

Described next is an eye-gaze direction detecting technique employed by the audience state detecting unit 22 with reference to FIG. 18.

Figure 18:
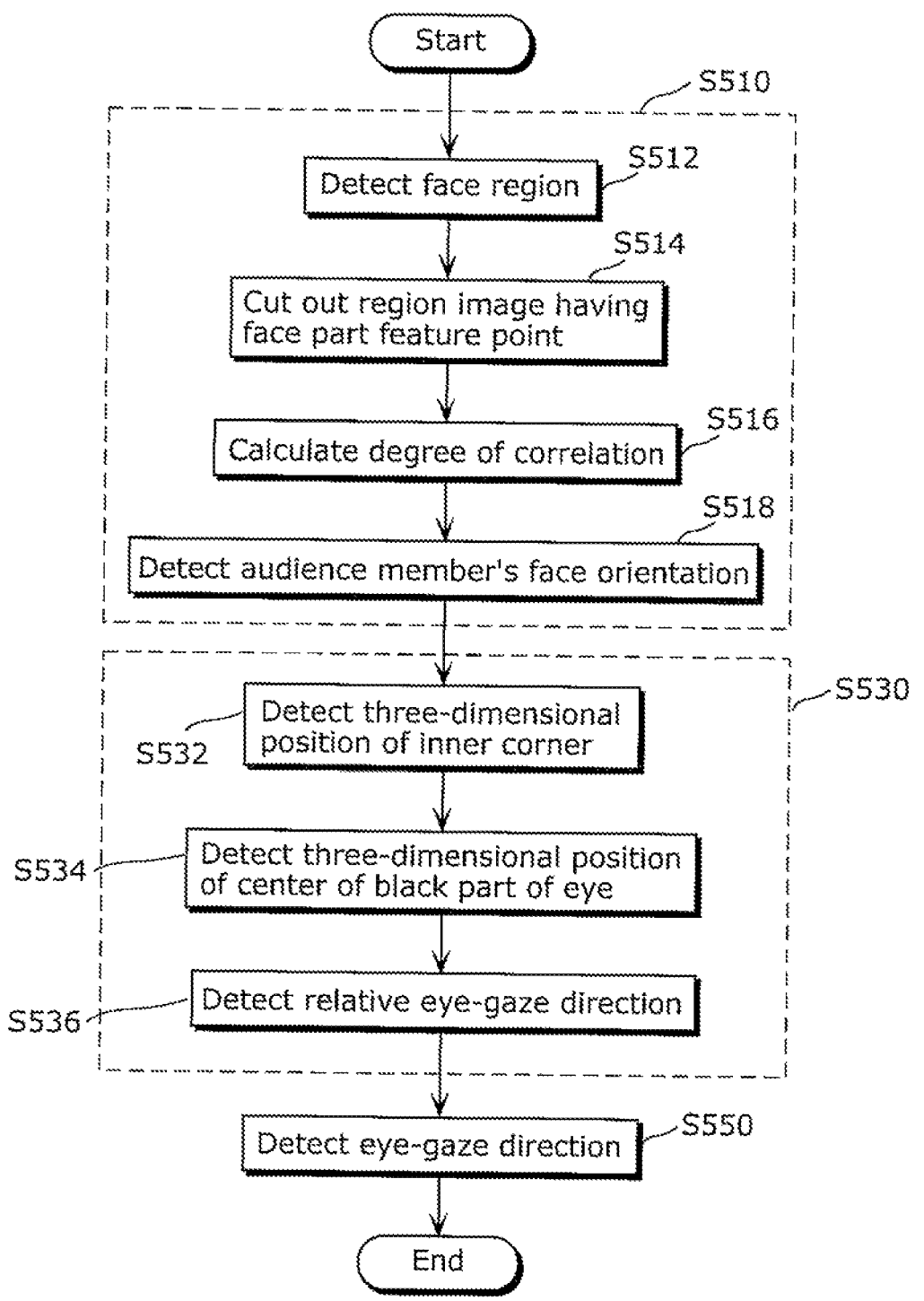
FIG. 18 is a flow chart showing a flow of a process for detecting an eye-gaze direction in Modification according to Embodiment 2 of the present invention.

FIG. 18 is a flow chart showing a flow of a process for detecting the eye-gaze direction in Modification according to Embodiment 2 of the present invention. Specifically, FIG. 18 shows a part of the process (Step S204 in FIG. 12) employed for detecting the audience state and executed on the audience state detecting unit 22.

As shown in FIG. 18, the audience state detecting unit 22 detects an eye-gaze direction based on the following results (S550): the result of detecting an orientation of the audience member's face (S510); and the result of detecting a relative eye-gaze direction representing a relative eye-gaze direction with respect to the orientation of the face (S530).

Described first is how to detect the orientation of the face of the audience member (S510).

First, the audience state detecting unit 22 detects a face region out of images of an audience member found in front of the display (S512). Here, the images have been captured by the audience detecting cameras 60. Next, the audience state detecting unit 22 applies a region having a face part feature point to the detected face region, and cuts out a region image having each of face part feature points (S514). Here, the face part feature point is associated with each reference face orientation.

Then, the audience state detecting unit 22 calculates a correlation degree between the cut out region image and a pre-stored template image (S516). Based on the calculated correlation degree, the audience state detecting unit 22 calculates a weighted sum by weighting and adding angles of the corresponding reference face orientations. Finally, the audience state detecting unit 22 detects the weighted sum as the audience member's face orientation corresponding to the detected face region (S518).

As described above, the audience state detecting unit 22 executes the process including Steps S512 through S518 to detect an orientation of an audience member.

Described next is how to detect a relative eye-gaze direction (S530).

First, the audience state detecting unit 22 detects three-dimensional positions of inner corners of the audience member's both eyes using the images captured by the audience detecting cameras 60 (S532). Then, the audience state detecting unit 22 detects three-dimensional positions of the centers of the audience member's black parts of both eyes using the images captured by the audience detecting cameras 60 (S534). The audience state detecting unit 22 then uses an eye-gaze reference plane calculated out of the three-dimensional positions of the inner corners of the both eyes and the three-dimensional positions of the centers of the black parts of both eyes to detect the relative eye-gaze direction (S536).

As described above, the audience state detecting unit 22 executes the process including Steps S532 through S536 to detect a relative eye-gaze direction.

Then, the audience state detecting unit 22 uses the is orientation of the audience member's face and the relative eye-gaze direction both detected above to detect the eye-gaze direction of the audience member.

Described next in detail is how to detect an eye-gaze direction with reference to FIGS. 19 to 21B.

Figure 19:
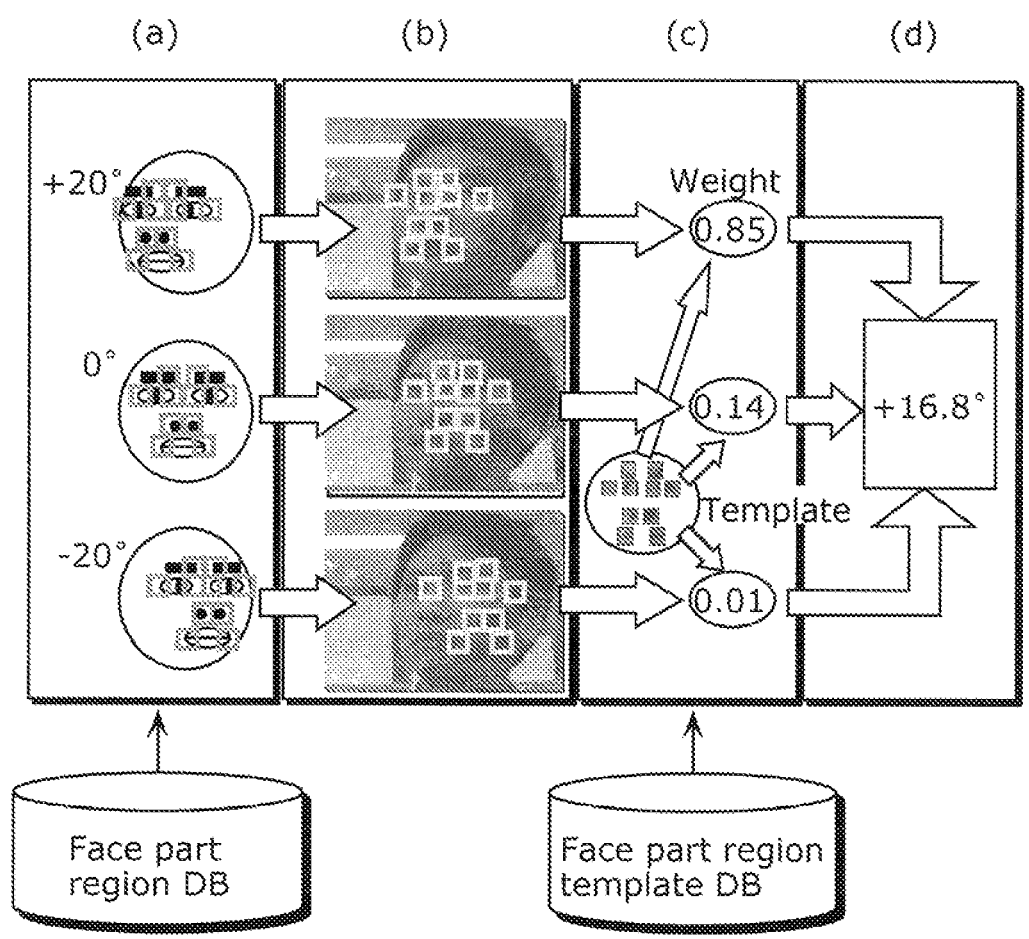
FIG. 19 shows how to detect an orientation of the audience member's face in Modification according to Embodiment 2 of the present invention.

FIG. 19 shows how to detect to which the face of the audience member turns in Modification according to Embodiment 2 of the present invention.

First, as shown in FIG. 19 (*a*), the audience state detecting unit 22 reads a region having a face part feature point out of a face part region database (DB). The face part region DB stores a region of a face part feature point corresponding to an associated reference face orientation. Then, as shown in FIG. 19 (*b*), the audience state detecting unit 22 (i) applies the region having the face part feature point to a face region of a captured image for each reference face orientation, and (ii) cuts out a region image having the face part feature point for each reference face orientation.

Furthermore, as shown in FIG. 19 (*c*), the audience state detecting unit 22 calculates for each reference face orientation a correlation degree between the cut out region image and a template image stored in a face part region template DB. The audience state detecting unit 22 also calculates a weight for each reference face orientation depending on magnitude of the calculated correlation degree. For example, the audience state detecting unit 22 calculates a ratio of the correlation degree for each reference face orientation to the total sum of the degrees of correlation of the reference face orientations.

Then, as shown in FIG. 19 (*d*), the audience state detecting unit 22 calculates the total sum of values each of which is obtained by multiplying an angle of the reference face orientation by the calculated weight. Finally, the audience state detecting unit 22 detects the calculated result as the orientation of the audience member. FIG. 19 (*d*) exemplifies weighting and detection of the face orientation as follows: an angle of a reference face orientation plus 20 degrees is weighted "0.45"; an angle of 0 degree is weighted "0.14"; and an angle of −20 degrees is weighted "0.01". Thus, the audience state detecting unit 22 detects the face orientation of the audience member as 16.8 degrees (=20×0.85+0×0.14+(−20)×0.01).

It is noted that, in Modification, the audience state detecting unit 22 employs an region image having a face part feature point to calculate a correlation degree; meanwhile, the audience state detecting unit 22 does not necessarily employ a region image having a face part feature point. For example, the audience state detecting unit 22 may calculate a correlation degree employing an image having the entire face region.

Moreover, another technique to detect a face orientation involves detecting face part feature points including an eye, a nose, and a mouth from a face image, and calculating a face orientation out of a positional relationship of the face part feature points. One of techniques to calculate a face orientation out of a positional relationship of face part feature points involves (i) rotating, enlarging, and reducing a prepared three-dimensional model having face part feature points so that the face part feature points most match face part feature points obtained from one of the camera, and (ii) calculating the face orientation out of the obtained rotation amount of the three-dimensional model. Another technique to calculate a face orientation out of a positional relationship of face part feature points involves (i) employing the principle of the stereo disparity based on images captured by two cameras to calculate a three-dimensional position for each face part feature point out of a mismatch found on the images of positions of face part feature points in the right and left cameras, and (ii) calculating the face orientation out of the positional relationship of the obtained face part feature points. Specifically, for example, the technique includes detecting a direction of a normal found on a plane including three-dimensional address points of a mouth and both eyes.

Described next is a technique used for detecting a relative eye-gaze direction with reference to FIGS. 20, 21A and 21B. In Modification, the audience state detecting unit 22 detects the following: first, an eye-gaze reference plane; then, three-dimensional positions of the centers of black parts of both of the eyes; and finally, a relative eye-gaze direction.

Described first is how to detect an eye-gaze reference plane.

Figure 20:
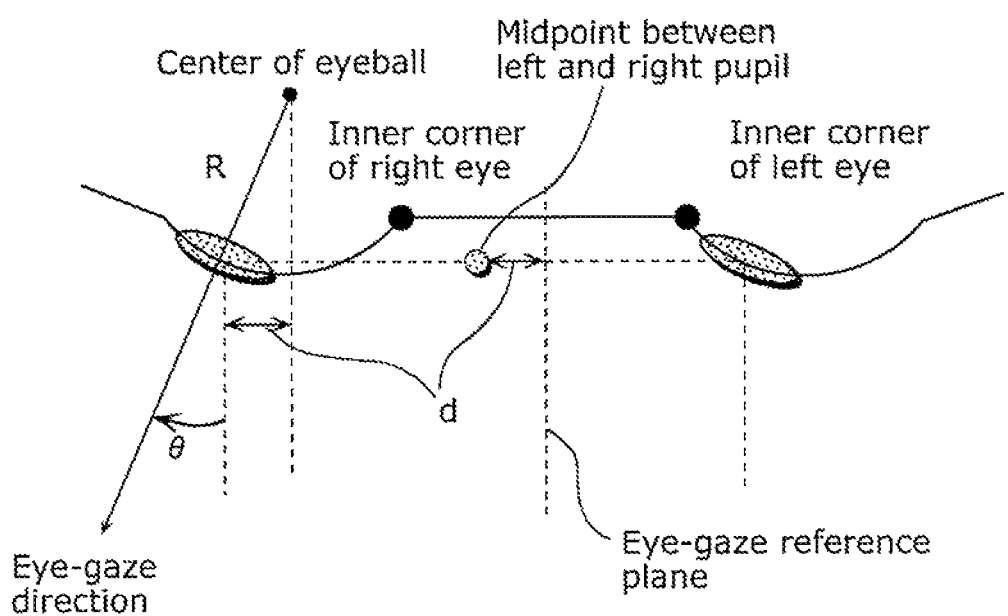
FIG. 20 shows an eye-gaze reference plane.

FIG. 20 shows an eye-gaze reference plane. In Modification, the audience state detecting unit 22 detects three-dimensional positions of the corners (inner corners) of the both eyes to detect the eye-gaze reference plane.

The eye-gaze reference plane, used as a reference in detecting a relative eye-gaze direction, is a bilateral symmetry plane of a face as shown in FIG. 20. The positions of the corners move less than other face parts such as tails of eyes, corners of a mouth, and eyebrows do, and thus cause fewer misdetections. Thus, in Modification, the audience state detecting unit 22 uses the three-dimensional positions of the corners of the both eyes to detect the eye-gaze reference plane representing the bilateral symmetry plane of the face.

Specifically, the audience state detecting unit 22 detects corner regions of the both eyes using a face detecting module and a face part detecting module for each of two images simultaneously captured by the first audience detecting camera 60*a* and the second audience detecting camera 60*b*. Then, the audience state detecting unit 22 detects three-dimensional positions of corners of both of the eyes, taking advantage of a mismatch (disparity) between the images of the detected corner regions. Furthermore, as shown in FIG. 20, the audience state detecting unit 22 detects, as the eye-gaze reference plane, the perpendicular bisector dividing a segment whose endpoints start at the three-dimensional positions of the corners of the both eyes.

Described next is how to detect the center of a black part of an eye.

Figure 21A:
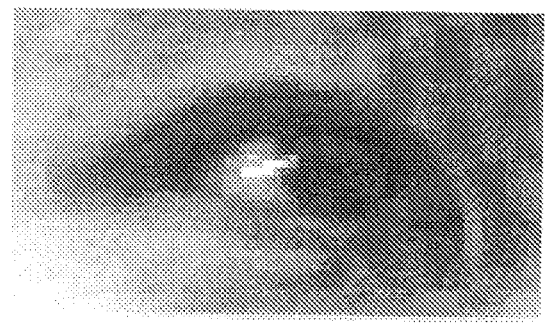
FIG. 21A shows how the center of a black part of an eye is detected.
Figure 21B:
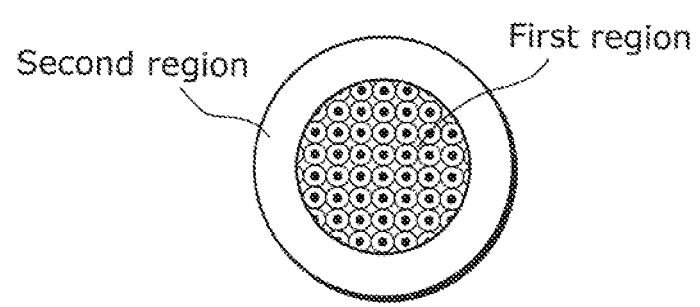
FIG. 21B shows how the center of the black part of the eye is detected.

FIGS. 21A and 21B show how to detect the center of a black part of an eye.

People visually recognize an object when (i) a light from the object arrives at the retina via the pupil to be converted into an electric signal, and (ii) the electric signal is transmitted to the brain. Thus, the use of a position of the pupil can detect an eye-gaze direction. However, pupils of Japanese people are black or blown. Thus, distinguishing between a pupil and an iris through an image process is difficult. Moreover, the center of the pupil approximately matches with the center of a black part of an eye (including both of the pupil and the iris). Hence, in Modification, the audience state detecting unit 22 detects the center of a black part of an eye when detecting a relative eye-gaze direction.

First, the audience state detecting unit 22 detects positions of a corner and a tail of an eye from a captured image. Then, from an image having a region including the tail and the corner of the eye as shown in FIG. 21A, the audience state detecting unit 22 detects a region with little luminance as a black-part-of-eye region. Specifically, for example, the audience state detecting unit 22 detects, as the black-part-of-eye region, a region whose (i) luminance is equal to a predetermined threshold or smaller and (ii) size is greater than a predetermined size.

Next, the audience state detecting unit 22 sets a black-part-of-eye detecting filter including a first region and a second area, as shown in FIG. 21B, to any given position in the black-part-of-eye region. Then, the audience state detecting unit 22 (i) searches for a position, of the black-part-of-eye detecting filter, at which an inter-regional dispersion between the luminance of a pixel in the first region and the luminance of a pixel in the second region becomes the greatest, and (ii) detects the position indicated in the search result as the center of the black part of the eye. Similar to the above, the audience state detecting unit 22 detects a three-dimensional position of the center of a black part of an eye, taking advantage of a mismatch of the centers of black parts of eyes found on simultaneously captured two images.

Described finally is how to detect a relative eye-gaze direction.

The audience state detecting unit 22 uses the detected eye-gaze reference plane and three-dimensional positions of the centers of the black parts of both of the eyes to detect the relative eye-gaze direction. Adult eyeballs rarely vary in diameter from person to person. In the case of Japanese people, for example, the diameter is approximately 24 mm. Once positions of the centers of the black parts of the both eyes are found when the audience member looks into a reference direction (front, for example), the audience state detecting unit 22 obtains displacement of the central positions of the black parts from the central positions to current central positions of the black parts of the eyes. Then, the audience state detecting unit 22 calculates to convert the obtained displacement into the eye-gaze direction.

A conventional technique requires calibration since the positions of the centers of the black parts of the both eyes when the audience member looks into a reference direction are not known. The technique in Modification, concurrently, employs the fact that the midpoint of a segment lying across the centers of the black parts of the both eyes is found in the middle of the face; that is on the eye-gaze reference plane, when the audience member faces the front. In other words, the audience state detecting unit 22 calculates the distance between the midpoint of a segment lying across the centers of the black parts of the both eyes and the eye-gaze reference plane to detect the relative eye-gaze direction.

Specifically, the audience state detecting unit 22 uses an eyeball radius "R" and the distance "d" between the midpoint of the segment lying across the centers of the black parts of the both eyes and the eye-gaze reference plane to detect, as the relative eye-gaze direction, a rotational angle θ observed in a horizontal direction with respect to a face orientation.

$$\theta = \sin^{-1}\left(\frac{d}{R}\right)$$ Expression 6

As described above, the audience state detecting unit 22 uses an eye-gaze reference plane and three-dimensional positions of the centers of the black parts of both of the eyes to detect relative eye-gaze direction. Then, the audience state detecting unit 22 uses the orientation of the audience member's face and the relative eye-gaze direction both detected above to detect the eye-gaze direction of the audience member.

The information displaying apparatus 20 according to Modification can easily detect an eye-gaze direction of an audience member as seen above, and highly accurately estimate an interest degree of the audience member employing the detected eye-gaze direction.

It is noted that in Modification the interest degree estimating unit 23 uses all of the following factors to estimate an interest degree: a traveling direction of an audience member; a traveling speed of the audience member; a position of the audience member; and an eye-gaze direction of the audience member. Meanwhile, the interest degree estimating unit 23 does not necessarily have to use all the above factors for estimating an interest degree. For example, when the gain "g1", the gain "g2", and the gain "g3" are 0 in Expression 5, the interest degree estimating unit 23 can calculate the interest degree "k" based only on the eye-gaze direction of the audience member.

It is noted in Embodiment 2 and Modification thereof that the information displaying apparatus 20 employs the distance "s" or the distance "t" to quantify closeness between (i) a traveling direction or an eye-gaze direction and (ii) a direction in which the audience member travels toward the position where contend is displayed. Concurrently, the information displaying apparatus 20 may use another technique to execute the quantification. For example, the information displaying apparatus 20 may employ, for example, an m absolute value of an angle (−180 degrees through 180 degrees) formed between (i) a traveling direction or an eye-gaze direction and (ii) a direction in which the audience member travels toward the position where contend is displayed in order to quantify closeness between (i) a traveling direction or an eye-gaze direction and (ii) a direction in which the audience member travels toward the position where contend is displayed.

Only some embodiments of an information displaying apparatus according to an implementation of the present invention have been described in detail above. However, those skilled in the art will readily appreciate that many modifications are possible in the exemplary embodiments without materially departing from the novel teachings and advantages of this invention, and therefore, all such modifications are intended to be included within the scope of this invention.

In above Modifications, for example, the information displaying apparatus includes a display such as a plasma display panel and a liquid crystal display panel; however, the information displaying apparatus does not necessarily include a display. The information displaying apparatus may be a projector projecting content on a projection area such as a screen and a sidewall.

Furthermore, the information displaying apparatus according to the implementation of the present invention may be modified below.

(1) Specifically, the information displaying apparatus is a computer system including a micro processor, a Read Only Memory (ROM), a Random Access Memory (RAM), a hard-disk unit, a display unit, a keyboard, and a mouse. The RAM or the hard-disk unit stores a computer program. The microprocessor operates on the computer program, which causes the information displaying apparatus to achieve a function thereof. Here, the computer program includes a combination of plural instruction codes sending an instruction to the computer in order to achieve a predetermined function. It is noted that the information displaying apparatus shall not be limited to a computer system including all of a micro processor, a Read Only Memory (ROM), a Random Access Memory (RAM), a hard-disk unit, a display unit, a keyboard, and a mouse. The information displaying apparatus may be a computer system including some of them.

(2) Some or all of the structural elements included in the information displaying apparatus may be included in a single system Large Scale Integration (LSI). A system LSI, an ultra-multifunction LSI, is manufactured with plural structural units integrated on a single chip. Specifically, the system LSI is a computer system having a micro processor, a ROM, and a RAM. The RAM stores a computer program. The microprocessor operates on the computer program, which causes the system LSI to achieve a function thereof.

The system LSI introduced here may be referred to as an Integrated circuit (IC), a super LSI, a ultra LSI, depending on integration density. Moreover, a technique of integrating into a circuit shall not be limited to the form of an LSI; instead, integration may be achieved in the form of a designated circuit or a general purpose processor. Employed as well may be the following: a Field Programmable Gate Array (FPGA) which is reprogrammable after manufacturing of the LSI; or a reconfigurable processor which makes possible reconfiguring connections and configurations of circuit cells within the LSI.

In the case where a technique of making an integrated circuit replaces the LSI thanks to advancement in a semiconductor technology or another technique which derives therefrom, such a technique may be employed to integrate functional blocks as a matter of course. Applied as the technique can be biotechnologies.

(3) Some or all of the structural elements included in the above described information displaying apparatus may be included in an IC card or a single module detachable to and from the information displaying apparatus. The IC card or the module is a computer system which consists of a micro processor, a ROM, and a RAM. The IC card and the module may also include the above described ultra-multifunction LSI. The micro processor operates on the computer program, which allows the IC card and the module to achieve the functions thereof. The IC card and the module may also be tamper-resistant.

(4) The present invention may be a method achieving operations of characteristic units included in the information displaying apparatus described above in steps. The method may be achieved in a form of a computer program executed on a computer or a digital signal including the computer program.

The present invention may further include a computer-readable recording medium which stores the computer program or the digital signal into the followings, for example: a flexible disk; a hard disk; a CD-ROM; a Magneto-Optical disk (MO); a Digital Versatile Disc (DVD); a DVD-ROM; a DVD-RAM; a Blu-ray Disc (BD); and a semi-conductor memory. The present invention may also be the digital signal recorded in the recording media.

The present invention may further transmit the computer program or the digital signal via a network and data broadcast mainly including an electronic communications line, a wireless or a wired communications line and the Internet.

The present invention may also be a computer system including a micro processor and a memory. The memory may store the computer program described above, and the micro processor may operate on the computer program.

The present invention can be implemented by another independent computer system by storing to transfer the program or the digital signal in a recording medium or via a network.

(5) The present invention may be a combination of the above embodiment with any of the above modification example.

[Industrial Applicability]

An information displaying apparatus according to an implementation of the present invention can change an exposure degree or a clarity degree of displayed content to increase an interest degree of an audience member in the displayed content. Thus, the information displaying apparatus can be used for displaying content which attracts an attention of an audience member including an advertisement, such as an outdoor electronic advertisement (digital signage) and a large-screen TV.

| [Reference Signs List] | |
|---|---|
| 10 and 20 | Information displaying apparatus |
| 11 and 22 | Audience state detecting unit |
| 12 and 23 | Interest degree estimating unit |
| 13 and 26 | Display control unit |
| 14 and 27 | Display unit |
| 21 | Audience member identifying unit |
| 24 | Targeted audience member selecting unit |
| 25 | Content database |
| 26a | Application control unit |
| 26b | Visualizing-on-display unit |
| 60 | Audience detecting camera |
| 60a | First audience detecting camera |
| 60b | Second audience detecting camera |

The invention claimed is:

1. An information displaying apparatus comprising:
a displaying unit configured to display first content on a display;
an audience state detecting unit configured to detect (i) a first audience state representing a physical state of an audience member positioned in front of the display at a first point in time, and (ii) a second audience state representing the physical state of the audience member positioned in front of the display at a second point in time after the first point in time;
an interest degree estimating unit configured to estimate (i) a first interest degree based on the first audience state detected by said audience state detecting unit, the first interest degree indicating a degree of interest of the audience member in the first content displayed on the display by said displaying unit at the first point in time, and (ii) a second interest degree based on the second audience state detected by said audience state detecting unit, the second interest degree indicating the degree of interest of the audience member in the first content displayed on the display by said displaying unit at the second point in time after the first point in time, and; and
a display control unit configured to (i) calculate a magnitude of a rate of change from the first interest degree to the second interest degree and (ii) cause said displaying unit to display second content with a clarity degree or an exposure degree of at least a part of the second content reduced below a predetermined clarity degree or a predetermined exposure degree when the magnitude of the rate of change from the first interest degree to the second interest degree is smaller than a first threshold.

2. The information displaying apparatus according to claim 1,
wherein said display control unit is further configured to raise the clarity degree or the exposure degree of the second content displayed on the display when the magnitude of the rate of change from the first interest degree to the second interest degree exceeds a second threshold.

3. The information displaying apparatus according to claim 1,
wherein said display control unit is configured to raise the clarity degree or the exposure degree of the second content displayed on the display when the first interest degree or the second interest degree estimated by said interest degree estimating unit exceeds a third threshold.

4. The information displaying apparatus according to claim 1,
wherein said display control unit is further configured to cause said displaying unit to display the second content when (i) the magnitude of the rate of change from the first interest degree to the second interest degree is smaller than the first threshold, and (ii) a state in which the magnitude of the rate of change from the first interest degree to the second interest degree is smaller than the first threshold lasts for a predetermined time period.

5. The information displaying apparatus according to claim 1,
wherein said audience state detecting unit is configured to detect a traveling direction of the audience member as the first audience state or the second audience state, and
wherein said interest degree estimating unit is configured to estimate that the degree of interest is higher as the traveling direction of the audience member detected by said audience state detecting unit is more similar to a direction from the audience member to either (i) a position of the display or (ii) a position at which the first content is displayed.

6. The information displaying apparatus according to claim 1,
wherein said audience state detecting unit is configured to detect a traveling speed of the audience member as the first audience state or the second audience state, and
wherein said interest degree estimating unit is configured to estimate that the degree of interest is higher as the traveling speed of the audience member detected by said audience state detecting unit is lower.

7. The information displaying apparatus according to claim 1,
wherein said audience state detecting unit is configured to detect a position of the audience member as the first audience state or the second audience state, and
wherein said interest degree estimating unit is configured to estimate that the degree of interest is higher as a distance is shorter between a position at which the first content is displayed and the position of the audience member detected by said audience state detecting unit.

8. The information displaying apparatus according to claim 1,
wherein said audience state detecting unit is configured to detect an eye-gaze direction of the audience member as the first audience state or the second audience state, and
wherein said interest degree estimating unit is configured to estimate that the degree of interest is higher as the eye-gaze direction of the audience member detected by said audience state detecting unit is more similar to a direction from the audience member to either (i) a position of the display or (ii) a position at which the first content is displayed.

9. The information displaying apparatus according to claim 1, further comprising
a targeted audience member selecting unit configured to select a targeted audience member from among audience members positioned in front of the display,
wherein, when a magnitude of a rate of change from a first interest degree of the targeted audience member to a second interest degree of the targeted audience member is smaller than the first threshold, said display control unit is configured to cause said displaying unit to display the second content.

10. The information displaying apparatus according to claim 9,
wherein, when the first interest degree or the second interest degree estimated by said interest degree estimating unit is equal to or greater than a fourth threshold, said targeted audience member selecting unit is configured to select an audience member matching with the first interest degree or the second interest degree as the targeted audience member.

11. The information displaying apparatus according to claim 9,
wherein, when a distance between a position at which the first content is displayed and a position of an audience member is smaller than a fifth threshold, said targeted audience member selecting unit is configured to select the audience member as the targeted audience member.

12. The information displaying apparatus according to claim 1, further comprising
a content database which stores at least an application area indicating a position of a part showing essential information which is a part of the second content and is intended to be directed to an audience member,
wherein said display control unit is configured to cause said displaying unit to display the second content with a clarity degree or an exposure degree of the application area of the second content reduced below the predetermined clarity degree or the predetermined exposure degree, the second content being stored in said content database.

13. The information displaying apparatus according to claim 1,
wherein the predetermined clarity degree or the predetermined exposure degree is the clarity degree or the exposure degree of the first content, and
wherein said display control unit is configured to cause said displaying unit to display the first content as the second content.

14. A method of displaying information, comprising:
displaying first content on a display;
detecting (i) a first audience state representing a physical state of an audience member positioned in front of the display at a first point in time, and (ii) a second audience state representing a physical state of the audience member positioned in front of the display at a second point in time after the first point in time;
estimating (i) a first interest degree based on the first audience state detected in said detecting, the first interest degree indicating a degree of interest of the audience member in the first content displayed on the display in said displaying the first content at the first point in time, and (ii) a second interest degree based on the second audience state detected in said detecting, the second interest degree indicating the degree of interest of the audience member in the first content displayed on the display in said displaying the first content at the second point in time after the first point in time;
calculating a magnitude of a rate of change from the first interest degree to the second interest degree; and
displaying second content with an area of a clarity degree or an area of an exposure degree of at least a part of the second content reduced below a predetermined clarity degree or a predetermined exposure degree when the magnitude of the rate of change from the first interest degree to the second interest degree is smaller than a first threshold.

15. A non-transitory computer-readable storage medium which stores a program causing a computer to execute the method of displaying information according to claim 14.

* * * * *